United States Patent
De Bien

(10) Patent No.: US 7,954,211 B2
(45) Date of Patent: *Jun. 7, 2011

(54) QUICK CONNECT COUPLING ASSEMBLY

(75) Inventor: Humberto De Bien, Titusville, FL (US)

(73) Assignee: Debien Products, Inc., Titusville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/655,612

(22) Filed: Jan. 4, 2010

(65) Prior Publication Data
US 2010/0111600 A1    May 6, 2010

Related U.S. Application Data

(60) Division of application No. 11/441,680, filed on May 26, 2006, now Pat. No. 7,640,639, which is a continuation-in-part of application No. 10/787,338, filed on Feb. 26, 2004, now Pat. No. 7,162,978, which is a continuation-in-part of application No. 10/371,028, filed on Feb. 20, 2003, now Pat. No. 6,955,138, which is a continuation-in-part of application No. 09/867,338, filed on May 29, 2001, now Pat. No. 6,629,511, which is a continuation-in-part of application No. 09/195,965, filed on Nov. 19, 1998, now Pat. No. 6,247,427, which is a continuation-in-part of application No. 08/958,111, filed on Oct. 27, 1997, now abandoned.

(60) Provisional application No. 60/029,573, filed on Oct. 28, 1996.

(51) Int. Cl.
*A44B 11/25* (2006.01)

(52) U.S. Cl. ......... 24/606; 24/303; 24/625; 24/DIG. 47; 24/624; 24/611

(58) Field of Classification Search .................. None
See application file for complete search history.

(56) References Cited

U.S. PATENT DOCUMENTS

| | | | |
|---|---|---|---|
| 765,823 A | 7/1904 | Erb, Jr. |
| 780,192 A | 1/1905 | Jones |
| 1,533,619 A | 4/1925 | Thompson |
| 2,526,790 A | 10/1950 | Wroblewski |
| 2,612,139 A | 9/1952 | Collins |
| 3,086,268 A | 4/1963 | Chaffin, Jr. |
| 3,099,250 A | 7/1963 | Soles, Jr. |
| 3,505,979 A | 4/1970 | Rosswag |

(Continued)

FOREIGN PATENT DOCUMENTS

DE          27 04 228          8/1978

(Continued)

*Primary Examiner* — Jack W. Lavinder
(74) *Attorney, Agent, or Firm* — Malloy & Malloy, P.A.

(57) ABSTRACT

A quick connect coupling assembly has a first and second component, and a locking assembly structured to retain the components in an attached orientation with one another. The locking assembly includes a plurality of locking elements each having a locking arm with a locking member mounted to a distal end, wherein the locking members are maintained in an outwardly extending orientation by a biasing mechanism. The biasing mechanism comprises a spring mounted between oppositely disposed locking elements, wherein the spring is structured to maintain the locking members in an outwardly extending orientation. The quick connect coupling assembly also includes a release mechanism to permit the locking members to be temporarily disposed into a retracted orientation, thereby permitting the first and second components to be detached from one another.

6 Claims, 29 Drawing Sheets

U.S. PATENT DOCUMENTS

| | | | |
|---|---|---|---|
| 3,540,089 A | 11/1970 | Franklin | |
| 3,589,341 A | 6/1971 | Krebs | |
| 3,693,484 A | 9/1972 | Sanderson, Jr. | |
| 3,693,596 A | 9/1972 | Croce et al. | |
| 3,776,198 A | 12/1973 | Gehrke | |
| 3,937,418 A | 2/1976 | Critelli | |
| 3,994,265 A | 11/1976 | Banks | |
| 3,995,789 A | 12/1976 | Carle | |
| 4,165,713 A | 8/1979 | Brawner et al. | |
| 4,277,934 A | 7/1981 | Rieck | |
| 4,328,767 A | 5/1982 | Peterson | |
| 4,404,714 A | 9/1983 | Duran | |
| 4,404,927 A | 9/1983 | Woutat | |
| 4,541,364 A | 9/1985 | Contello | |
| 4,573,725 A | 3/1986 | Griffiths | |
| 4,621,589 A | 11/1986 | Thinnes | |
| 4,690,495 A | 9/1987 | Giannini | |
| 4,759,686 A | 7/1988 | Kirst | |
| 4,831,694 A | 5/1989 | Kong | |
| 4,917,049 A | 4/1990 | Peterson | |
| 4,998,507 A | 3/1991 | Browning | |
| 5,003,929 A | 4/1991 | Dean | |
| 5,022,351 A | 6/1991 | Daniels | |
| 5,103,771 A | 4/1992 | Lee | |
| 5,144,725 A | 9/1992 | Krauss | |
| 5,355,562 A * | 10/1994 | Matoba et al. | 24/625 |
| 5,401,034 A | 3/1995 | Mallinger | |
| 5,443,039 A | 8/1995 | Suchowski | |
| 5,595,143 A | 1/1997 | Alberti | |
| 5,692,275 A | 12/1997 | Freeman et al. | |
| 5,716,160 A | 2/1998 | Lee | |
| 5,791,297 A | 8/1998 | Mudge | |
| 5,815,895 A | 10/1998 | Carlson et al. | |
| 5,887,550 A | 3/1999 | Levine et al. | |
| 6,003,472 A | 12/1999 | Matt et al. | |
| 6,041,479 A | 3/2000 | Colpo | |
| 6,041,571 A | 3/2000 | Fields et al. | |
| 6,145,172 A | 11/2000 | Bourdon | |
| 6,163,942 A | 12/2000 | Liao | |
| 6,247,427 B1 | 6/2001 | De Bien | |
| 6,390,529 B1 | 5/2002 | Bingle et al. | |
| 6,629,511 B2 | 10/2003 | De Bien | |
| 7,162,978 B2 | 1/2007 | De Bien | |
| 7,640,639 B2 * | 1/2010 | de Bien | 24/615 |

FOREIGN PATENT DOCUMENTS

| | | |
|---|---|---|
| FR | 2105389 | 4/1972 |
| GB | 2 152 348 A | 8/1985 |
| WO | WO 02/096193 A1 | 12/2002 |

* cited by examiner

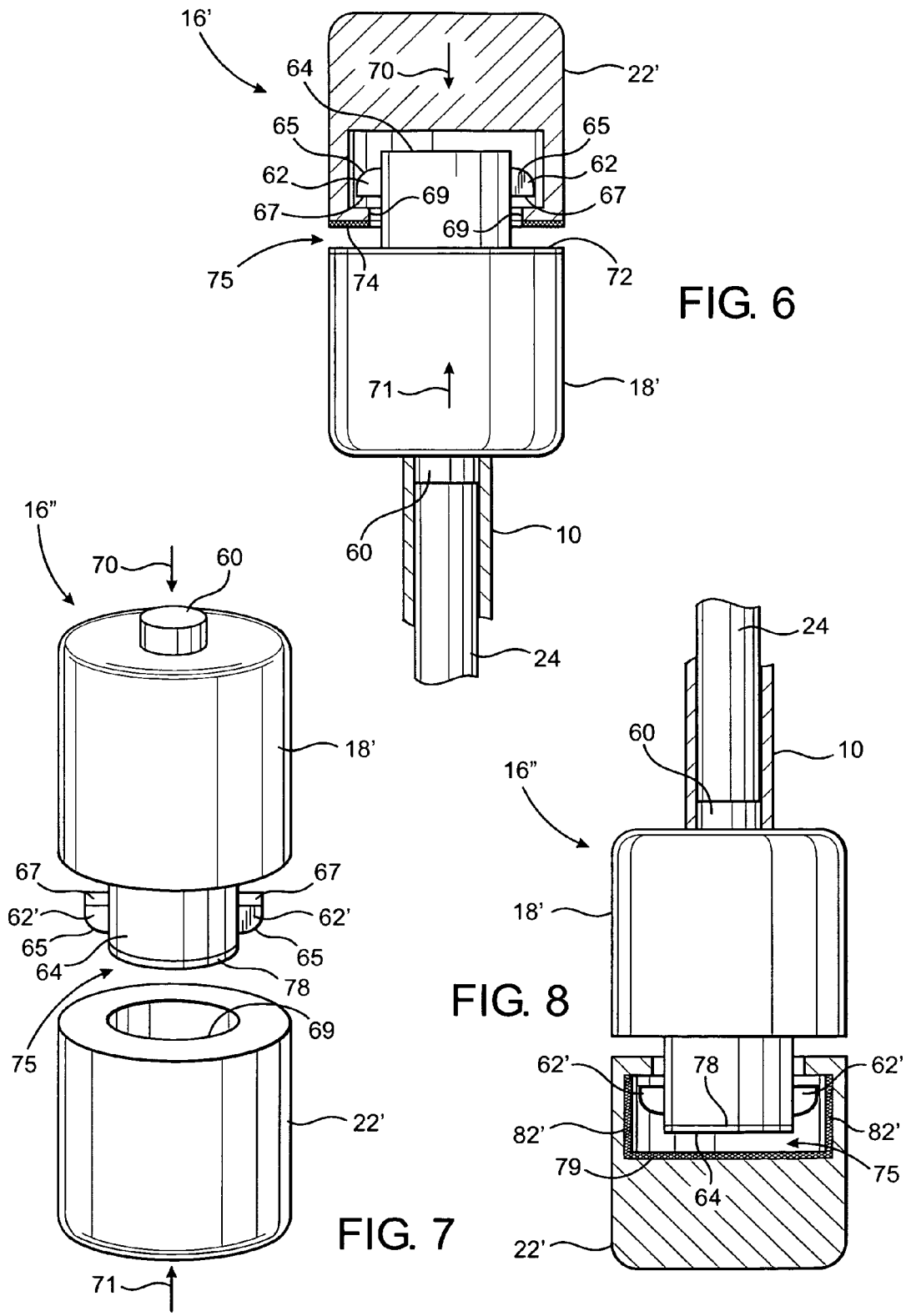

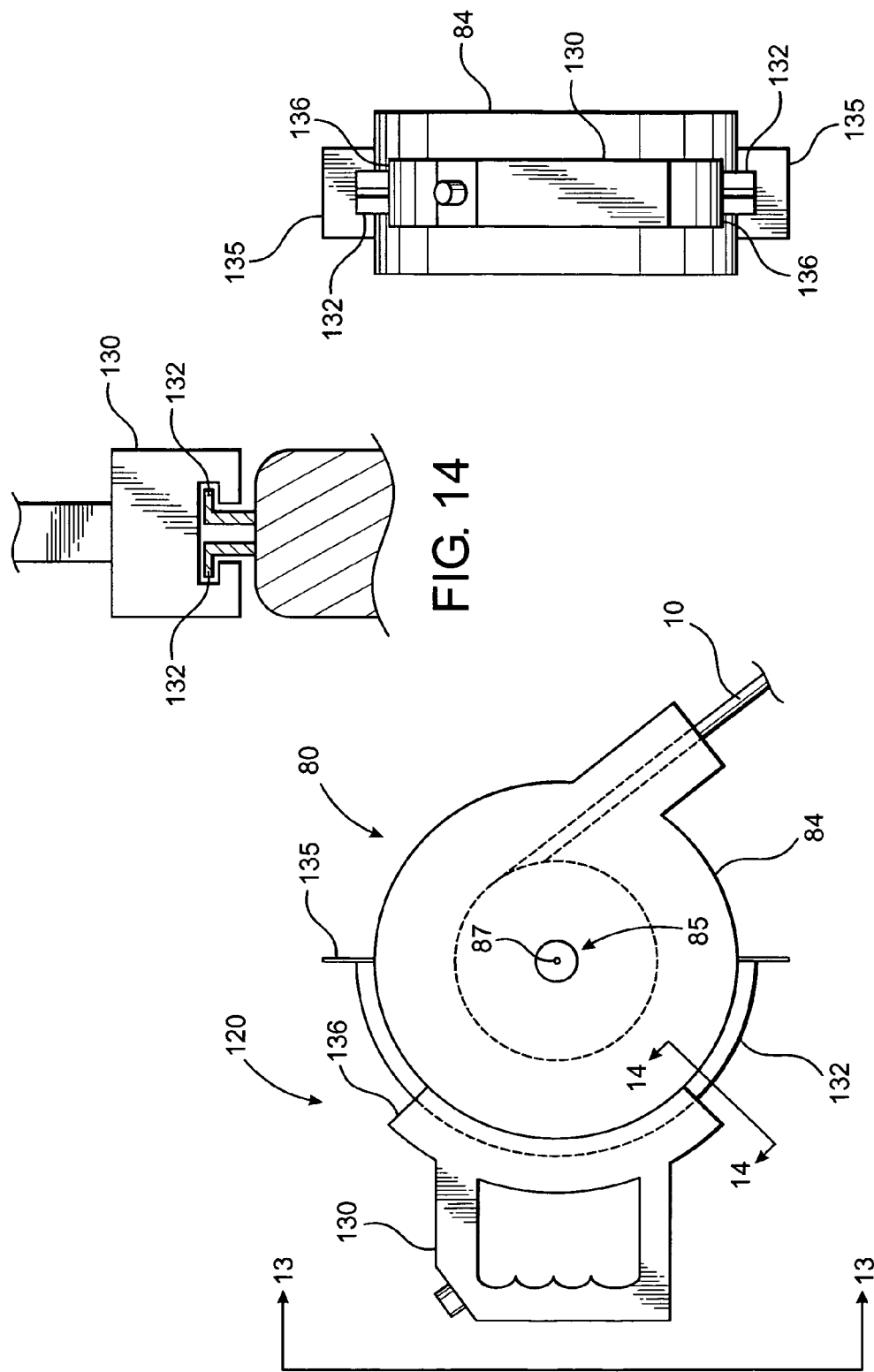

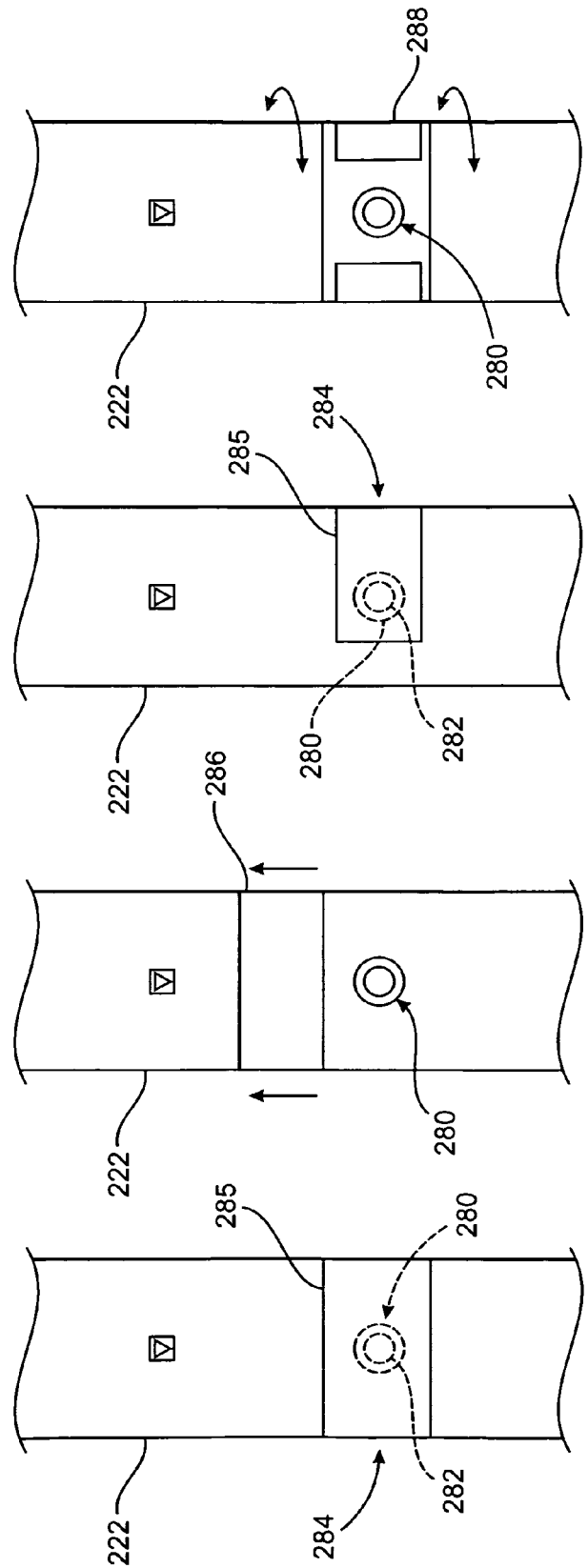

QUICK CONNECT COUPLING ASSEMBLY

CLAIM OF PRIORITY

The present application is a divisional patent application of previously filed, U.S. patent application Ser. No. 11/441,680 filed on May 26, 2006 now U.S. Pat. No. 7,640,639, which is a continuation-in-part of U.S. patent application Ser. No. 10/787,338 filed on Feb. 26, 2004, now U.S. Pat. No. 7,162,978, which is a continuation-in-part of U.S. patent application Ser. No. 10/371,028 filed on Feb. 20, 2003, now U.S. Pat. No. 6,955,138, which is a continuation-in-part of U.S. patent application Ser. No. 09/867,338 filed on May 29, 2001, now U.S. Pat. No. 6,629,511, which is a continuation-in-part of U.S. patent application Ser. No. 09/195,965 filed on Nov. 19, 1998, now U.S. Pat. No. 6,247,427, which is a continuation-in-part of U.S. patent application Ser. No. 08/958,111 filed on Oct. 27, 1997, now abandoned, which claimed priority under 35 U.S.C. 119(e) to provisional patent application having Ser. No. 60/029,573, filed on Oct. 28, 1996, now abandoned, each of which are incorporated by reference herein in their entirety.

BACKGROUND OF THE INVENTION

1. Field of the Invention

The present invention is directed to a quick connect coupling assembly including a plurality of locking elements each having a locking member structured and disposed to be maintained in an outwardly extending orientation by a biasing mechanism. The biasing mechanism comprises a spring mounted between oppositely disposed locking elements, wherein the spring is structured to maintain the locking members in an outwardly extending orientation.

2. Description of the Related Art

It is widely known that there are millions of dog owners in this country as well as other countries throughout the world. Dogs comprise one of the most popular types of animals for household pets. Of course, dogs are extremely popular animals for other than simple companionship. Other uses of dogs include working dogs and show dogs. In turn, working dogs may be classified as dogs utilized for police enforcement purposes, military activities, dogs trained for hunting and also dogs specifically trained to aid those individuals who are visually impaired.

Regardless of the above classifications, the care and maintenance of dogs require the use of numerous auxiliary or supplementary items. Among the most popular is the dog leash or tethering assembly wherein dogs are retained and/or restricted for purposes of control when not contained by fences in a yard or like area. Moreover, similar type leash assemblies are also useful on a variety of different animals including pets and farm animals, such as horses.

It is also well recognized that leash structures, collars, harnesses, etc., are available in numerous and varying designs intended to control an animal for different purposes. Prior art structures exist which comprise leash and collar combinations specifically structured such that the length of a lead of the leash assembly is selectively variable so that the dog or animal being tethered may enjoy a greater range of movement and freedom when the surrounding area allows. Alternately, the tethered animal may be restrained, by shortening the length of the extendable lead in areas which do not allow the free roaming of the dog. Other prior art leash or tethering assemblies are specifically designed to allow control and retention of the dog or other animal while significantly reducing or eliminating the tangling of the dog in the retaining harness and/or about an anchoring structure to which the animal is tethered.

An area which is not currently addressed by leash and retaining harness assemblies is the ability to quickly and easily connect an animal to the leash assembly and to permit release of the animal from a spaced distance from the animal, such as a remote location. In the majority of conventional or known leash assemblies, it is necessary for a handler to manipulate a coupling structure utilizing both hands, wherein the coupling structure serves to connect the distal end of the lead to the collar or retaining harness mounted on the animal. This generally involves direct handling or manipulation of any one of a large variety of such coupling structures. Attachment of the animal can be extremely difficult, particularly when the dog or animal being tethered is overly frisky or otherwise in an excited state. Also, in accomplishing either attachment or detachment of the lead from the collar or like harness particular problems are encountered by the elderly or by those who are visually or otherwise physically challenged.

In addition to the above, the handling of larger animals, such as horses and/or working dogs of the type trained to conduct police enforcement and/or military activities, requires that the animal be kept under control by the handler. However, in cases of emergency, it is equally important that the animal be released or detached from his controlling lead as quickly as possible as it could be dangerous for the animal to begin running while dragging the lead or any part of the leash assembly. Conversely, if the animal is loose, it may be necessary to quickly re-harness the animal in order to restrain its movement in a hazardous situation.

A further problem is encountered in the handling, and in particular, the transportation, of horses. Specifically, when a horse is being confined in a trailer they often become anxious and/or excited. Combined with the tight space limitations of most trailers, the excited condition of the animal presents a dangerous situation for the handler who must enter the trailer to either attach or release the animal from the trailer. Thus, it would be advantageous and potentially life saving for both the animal and the handler to provide a means to remotely release a horse that is attached to a trailer. At a minimum, it would be advantageous to provide a remote, emergency release activation mechanism on an exterior portion of the trailer, such that the animal could be released without requiring the handler to enter the trailer, which may cause the animal to become even more anxious or excited.

Another area which the prior or related art does not address is related to facilitating adjustment of the length of the lead by the handler utilizing a retractable leash assembly. In particular, although the prior art devices allow the length of the lead, and thus, the distance between the animal and the handler, or a fixed tethering location, to be adjusted, they do not provide a means to align the lead for smooth and easy retraction or release of the lead regardless of the relative position of the animal to the handler or the tethering location. More specifically, when the lead is extended a long distance, the angle formed between the lead to the handler is quite different than the angle formed when the animal is in close proximity. Thus, the handler is forced to constantly adjust the position of the device relative to the animal to prevent binding of the lead with the housing of the device during retraction or release of the lead to or from the handle, respectively. Additionally, movement of the animal to the left or right of the handler or tethering location may also increase the potential for binding of the lead upon retraction or release of the lead into or from the housing of the assembly. Nor does the prior leash and/or tethering assembly art provide a means to lock the lead in position relative to the assembly upon detection of a specific release velocity or sudden acceleration of the lead from the housing, as may occur when an animal becomes excited or angry and bolts from the handler or the tethering location.

Accordingly, there is a recognized need in this area for a leash or tethering assembly including a quick connect coupling assembly having coupling components structured to easily align into position for connection by a handler with a single hand. It would also be preferable for such an assembly to allow connection and release from an animal by the handler while in an upright position, thereby eliminating the need for the handler to bend over, such as may be inconvenient for elderly or infirm handlers. Further, such a preferred leash or tethering assembly should be structured to permit quick and effective detachment or release of the animal via an activation assembly located a spaced distance from the animal and the coupling component serving to connect the animal harness to the lead. Preferably, such an activation assembly may utilize mechanical, electrical, and/or magnetic forces to facilitate the alignment and interconnection of the coupling components. Further, it would be beneficial for the activation assembly to utilize mechanical, electrical, magnetic, electromagnetic, fiber optic, computer generated, and/or remote voice activated signals to effect the release of the coupling components of the leash assembly from one another.

It would further be beneficial to provide a leash assembly including wherein the activation assembly includes a lead aligning mechanism structured to maintain the lead in position relative to the housing of the activation assembly as the lead is retracted and/or released into or from the housing, respectively, to minimize binding of the lead with the housing. Yet another desirable feature for such a leash assembly is a release control mechanism to prevent unwanted release of a lead upon sudden acceleration of the animal away from the handler or tethering location, as may occur when an animal becomes excited or angry.

Another disadvantage of the retractable leash assemblies of the type commercially available is that they are typically spring biased to the extent that a release mechanism allows a free extension of the lead as the tethered animal travels a greater distance from the handler. As such, in these known devices, the lead cannot normally be retracted or rewound without the handler first providing slack in the lead by following or chasing the animal and thereby shortening the distance between the handler and the animal prior to rewinding the lead for storage. Therefore, it would also be desirable to provide a leash or tethering assembly having a drive mechanism, to facilitate the retrieval of an animal attached to the leash assembly to the proximity of the handler or tethering location without requiring the handler to traverse the distance between themselves and the animal.

Further, while the foregoing discussion is directed to the leash and tethering assembly art, it is envisioned that such a quick connect coupling assembly as described herein will have numerous other practical applications including, but not limited to, tie downs for tools and equipment, securing luggage and/or sporting equipment, temporary barrier devices, body harnesses, and key chains, as well as in the area of robotics, including integration into automated factory assembly line operations, and remotely controlled devices utilized by military, law enforcement, emergency, and rescue personnel, just to name a few.

SUMMARY OF THE INVENTION

The present invention relates to a leash assembly designed to allow control of a dog or other animal by a handler and which is structured to accomplish a quick detachment of the animal from a remote position without requiring the direct handling or manipulation of the quick connect coupling assembly serving to interconnect the collar, harness, or similar attachment assembly to the distal end of the lead. The present invention is also designed and structured to provide a quick and efficient attachment of a lead to an attachment assembly utilizing only a single hand of the user or handler. More specifically, the present invention comprises a flexible material lead being of any appropriate or preferred length and terminating at a distal end and an oppositely disposed proximal end. A preferably rotating coupling component is connected, at least in part, to the distal end of the lead and is specifically structured to accomplish a quick and easy attachment of the lead to the attachment assembly, as well as a quick release or detachment of the lead from an attachment assembly mounted directly on the animal being tethered.

In order to accomplish such quick release of the coupling assembly, the present invention further comprises a release structure preferably in the form of a release or positioning cable formed of metallic or other applicable material having sufficient structural integrity to be movable axially along its own length and to exert an axially directed force on a coupling assembly to be described in greater detail hereinafter. The term "structural integrity" refers to the structural features of the release cable being of a material with sufficient rigidity, while still being flexible, to exert the aforementioned axially directed force on the coupling assembly or otherwise structured to be axially moveable along the length of the lead so as to exert the aforementioned force on the coupling assembly and thereby orient the coupling assembly in a disconnect position, as will be explained in greater detail hereinafter.

The release structure or cable is mounted on and preferably within the interior of the lead and extends along the length thereof between the aforementioned distal end and proximal end. One end of the release cable is disposed adjacent the distal end of the lead and is connected directly to the preferably rotating coupling component. Selective axial movement of the release cable causes a disconnection of the coupling components defining the subject coupling assembly. The aforementioned quick release is thereby accomplished from a location remote from the animal without the necessity of directly handling or manipulating the coupling assembly. Alternate embodiments of the present invention include a coupling assembly comprising magnetically attractive components, and a release structure comprising an electromagnet whose polarity may be reversed to alternately facilitate automatic attachment and detachment of the components.

To accomplish the desired quick release, the present invention also includes an activation assembly mounted adjacent the proximal end of the lead and includes an activation member connected directly to the correspondingly positioned end of the release cable. Depending upon the various embodiments, to be described in greater detail hereinafter, the activation member may be disposed and configured for direct manipulation by a thumb or finger of a single hand of a person gripping a handle portion of the activation assembly which is connected to the proximal end of the lead. By depressing or otherwise manipulating the activation member, the release cable is forced to move axially along its length relative to the lead on which it is mounted. This movement will cause an axially directed force to be exerted directly on at least one of the coupling components of the coupling assembly and a disconnection of the coupling assembly. A quick release and/or detachment of the attachment assembly will thereby be effected. Additional embodiments of the present invention include an electronically operated activation assembly, which may or may not be radio activated.

Another feature of one preferred embodiment of the leash assembly of the present invention further includes an activation assembly comprising a drive motor to be actuated by a user. The drive motor is configured, such as by attachment to a storage or take-up spool, to effectuate storage of the lead itself and/or activation of the quick release structure.

An additional embodiment of the present invention includes the coupling assembly structured to provide a quick attachment and detachment of the distal, free end of the lead to the attachment assembly mounted on the animal. In addition, a similarly structured coupling assembly may be used to connect opposite free ends of the attachment assembly to one another around the animal in an intended fashion. In the aforementioned coupling assembly, first and second components are structured so as to be attached to one another in a manner which only requires a single hand of the handler or user of the leash assembly of the present invention. Quick and easy release of the two components of the coupling assembly from one another is accomplished by manipulation of the activation assembly and movement of the release structure mounted within the lead, as set forth above. More specifically, each of the components of the present invention may be positioned into a predetermined aligned engagement with one another such that a pushing force exerted on the first and second components of the coupling assembly will cause a quick and efficient attachment of the two components to one another. Such quick attachment can be accomplished without manipulation of a spring biased plunger normally associated with generally known, swivel type coupling assemblies. Further, the coupling assembly may include an alignment assembly structured and disposed to facilitate the aforementioned predetermined aligned engagement of the components with one another. The alignment assembly preferably comprises magnetic surfaces on each component of the coupling assembly cooperatively disposed in engageable relation with one another when the components are aligned.

It is an object of the present invention to provide a leash assembly which is strong and secure, yet which also provides for the quick and easy release of the animal restrained thereby.

A further object of the present invention is to provide a leash assembly which is substantially easy to operate and does not require direct user manipulation of a coupling assembly when connecting the attachment assembly on the animal to a lead associated with the leash assembly.

It is also an important object of the present invention to provide a leash assembly structured to facilitate rapid and efficient connection of an attachment assembly, mounted on the animal, to a lead in a manner which requires minimal manipulation and the use of only one hand of the animal handler.

Yet another object to the present invention is to provide a leash assembly including a lead which may be retracted or extended in a controlled manner whether or not the free end of the lead is secured to the attachment assembly. It is also an important object to the present invention to provide the leash assembly, including the various operative components associated therewith, which is formed from a light weight yet durable material so as to be operable over an extended period and which is structurally designed to be produced or manufactured relatively inexpensively so as to make the present invention available to a wide range of potential customers.

It is a further object of this invention to provide a quick connect coupling assembly which may be utilized in a variety of other connection applications. The need for a coupling assembly permitting quick release and/or attachment exists in many applications, for example, tie downs for equipment, tools, or machinery, securing luggage and/or sporting equipment, temporary barrier devices, body harnesses, and key chains. Thus, the present invention provides such a quick connect coupling assembly for the aforementioned applications, however, the present invention may be utilized in numerous other connection applications as may easily be envisioned.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 6 is a detailed view in partial cutaway and section showing structural details of one preferred embodiment of a quick connect coupling assembly of the present invention.

FIG. 7 is a perspective view in partially exploded form of another preferred embodiment of the quick connect coupling assembly associated with the present invention.

FIG. 8 is a front view in partial section of the embodiment of FIG. 7 in a connected position.

FIG. 12 is a side view of another embodiment of an activation assembly of the present invention illustrating a lead aligning mechanism.

FIG. 13 is an end view of the activation assembly of FIG. 12 along lines 13-13 thereof.

FIG. 14 is a partial cross-section view of the activation assembly of FIG. 12 along lines 14-14 thereof.

FIGS. 36 and 36A are partial elevational views of a quick connect coupling assembly having a slidable safety member disposed in a safety on and a safety off position, respectively.

FIGS. 37 and 37A are partial elevational views of a quick connect coupling assembly having a rotatable safety member disposed in a safety on and a safety off position, respectively.

Like reference numerals refer to like parts throughout the several views of the drawings.

DETAILED DESCRIPTION OF THE PREFERRED EMBODIMENT

Figure 1:
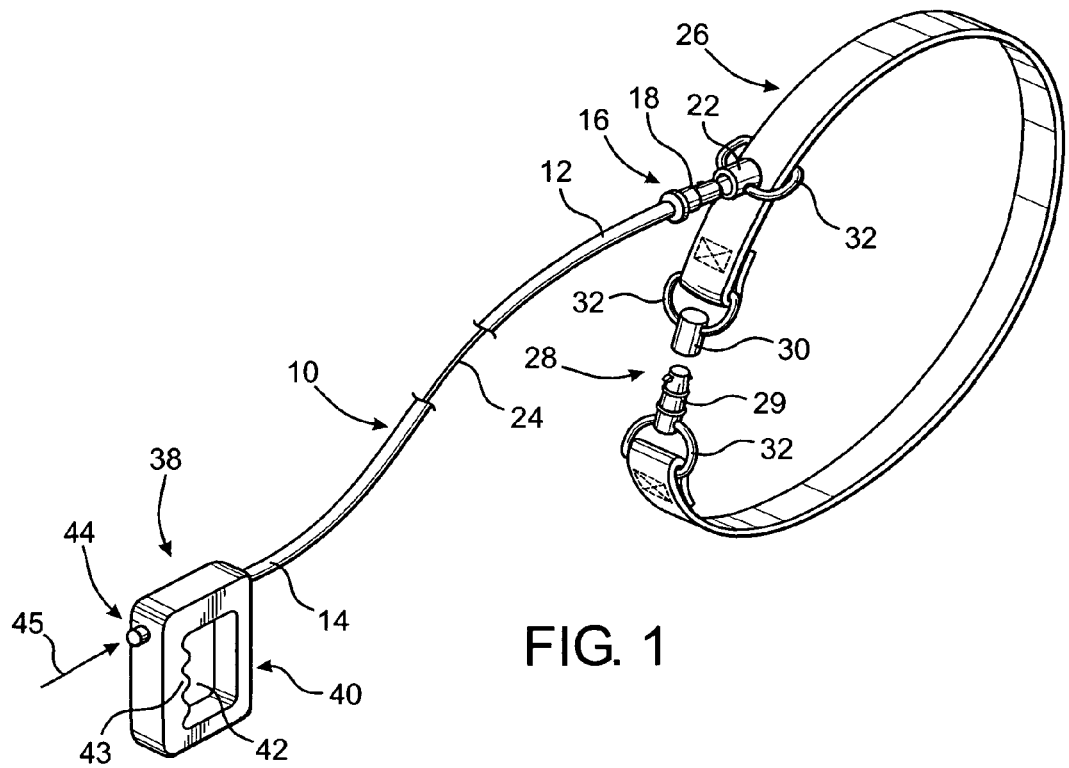
FIG. 1 is a perspective view in partial cutaway showing the various structural features of one preferred embodiment of the present invention.

As shown in the accompanying Figures, the present invention is directed towards a retractable leash assembly wherein a preferred embodiment is disclosed in FIG. 1 and includes a lead as in 10 being of any applicable or desired length and further being formed of a flexible material so as to facilitate freedom of movement of both the animal and the handler or user of the subject assembly, and to a quick connect coupling assembly which includes a coupling assembly generally shown as 16, a release structure generally shown as 24, and an activation assembly generally shown as 38, as disclosed herein.

The lead 10 terminates at a distal end 12 and a proximal end 14, which are oppositely disposed relative to one another. Moreover, a coupling assembly 16 is secured, at least in part, adjacent the distal end 12 of the lead 10 and includes a first component as in 18 and a second component as in 22. The first component 18 may be secured to the distal end 12 of the lead 10 and is connected to a release structure which may be defined in one embodiment by a release or positioning cable 24. With further reference to the coupling assembly 16, the second component 22 may be mounted on or attached to a collar, harness, or similar attachment assembly as at 26 designed to be mounted directly on the animal's body in the conventional fashion. Alternatively, the second component 22 may be secured to a distal end of a second lead structure as in a tie down assembly, or it may be secured to a fixed structure. Opposite ends of the attachment assembly 26 may define connectable portions and if desired may be removably attached using a similar second coupling assembly generally indicated as 28 similar in operation to the coupling assembly 16 associated with the lead 10. Moreover, the attachment assembly 26 itself may be integrated as part of the present invention wherein the coupling assembly 28 incorporates specific structural improvements set forth in greater detail hereinafter which provides a quick and efficient attachment or coupling of opposite ends of the attachment assembly 26. The second coupling assembly 28 of the present invention also includes a first component 29 and a second component 30 designed to be removably and quickly attached and detached relative to one another so as to secure the attachment assembly 26 about the neck of the dog or other animal being tethered. Loop type connecting elements as at 32 may serve to movably mount or attach the components 29, 30 of the second coupling assembly 28 to the opposite ends of the attachment assembly 26.

A loop type connector 32 may also serve to movably mount the second component 22 of the coupling assembly 16 to the attachment assembly 26 such that the entire coupling assembly 16 is allowed to move freely along the length of the attachment assembly 26 in order to provide the animal more freedom when connected to the lead 10 and also to reduce the possibility of tangling of the attachment assembly 26 with the remainder of the lead 10.

Figure 3:
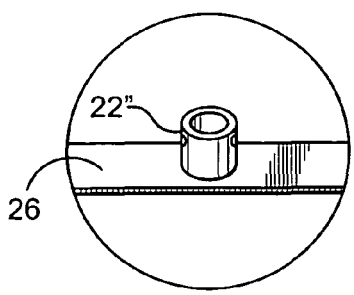
FIG. 3 is a detailed view showing another embodiment of the present invention.

With regard to FIG. 3, an alternate embodiment is disclosed wherein the second component indicated as 22" is fixedly mounted on an exterior surface of the attachment assembly 26. The structural features of the second component 22" are similar to that of the second component 22 of FIG. 1 in that it is designed to removably receive the first component 18 therein.

Figure 2:
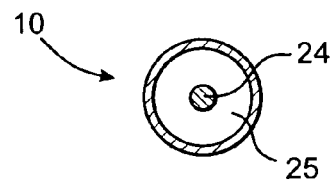
FIG. 2 is a sectional view of a lead of the leash assembly of FIG. 1.
Figure 2A:
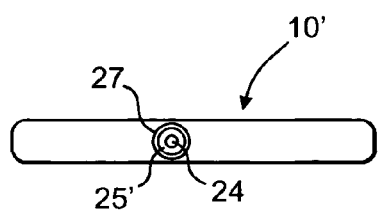
FIG. 2A is a sectional view of the lead of FIG. 4.

With reference to the embodiment of FIGS. 1 and 2, the release structure which comprises release cable 24 in a preferred embodiment, is preferably mounted within an interior 25 of an outer flexible material, such as lead 10, as illustrated in FIG. 2. The lead 10 may therefore assume a generally tubular configuration so as to enclose the release cable 24 in a hollow interior 25 thereof. Alternatively, as illustrated in FIG. 2A, a separate hollow sheath structure 27 may be provided and preferably secured to or embedded or concealed within the lead 10'. The sheath structure includes a hollow interior 25' and preferably extends along the entire length of the lead 10' so as to enclose the release cable 24 therein along substantially its entire length. Such a configuration is particularly beneficial in woven material lead structures, or if the lead structure is to be wound, because movement of the release cable 24 while in an at least partially wound position is required. In the embodiment illustrated in FIG. 2A, the sheath structure 27 is configured to facilitate the sliding movement of the release cable 24 relative to the lead 10'.

Figure 4:
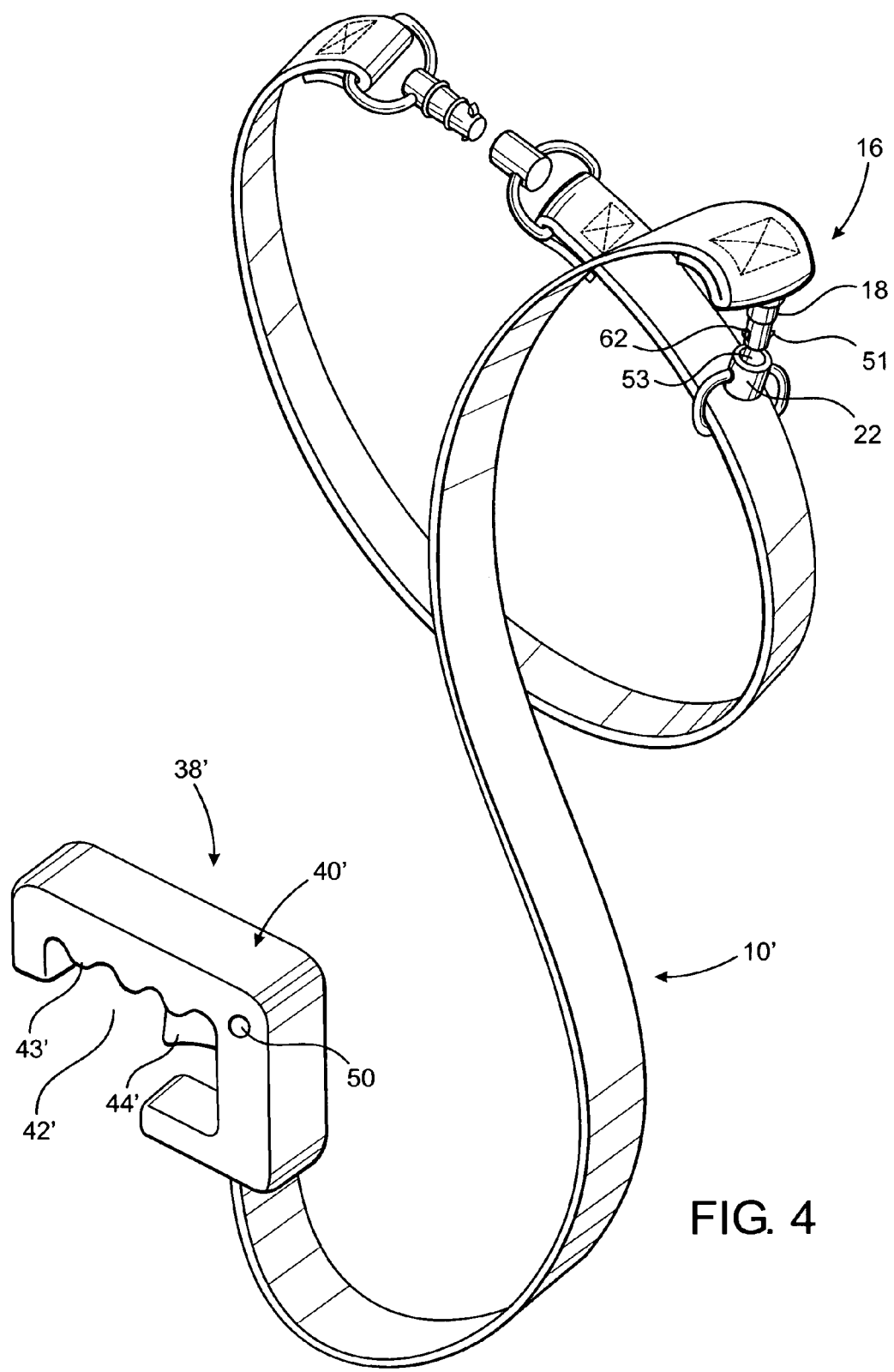
FIG. 4 is a perspective view showing yet another preferred embodiment of the present invention.
Figure 5:
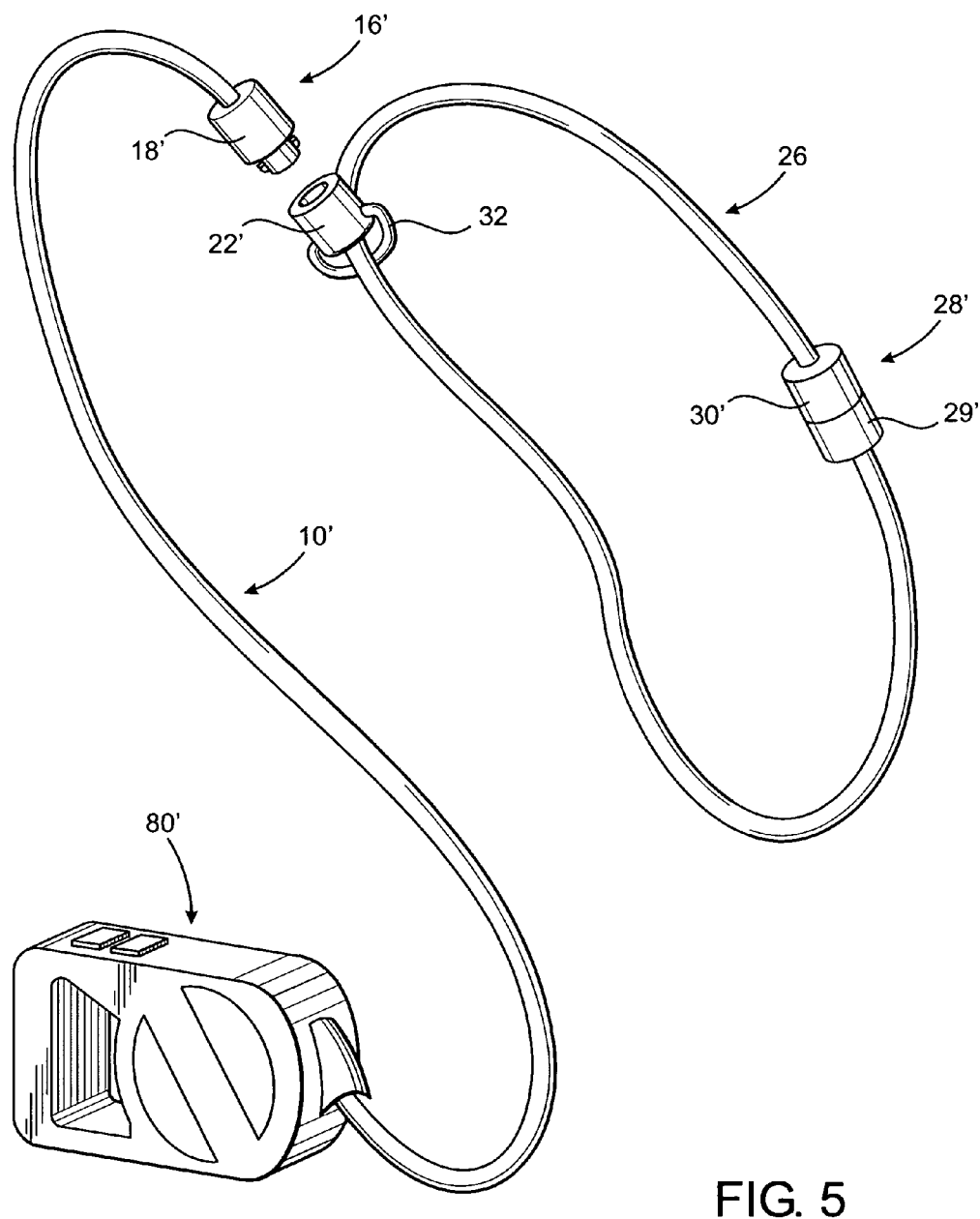
FIG. 5 is a perspective view of another, preferred embodiment of the present invention.

As set forth above, the coupling assemblies 16 and/or 28 may be similarly structured and, as also set forth above, additional, more preferred embodiments of the coupling assemblies similar to 16 and 28 are shown in detail in FIGS. 6-8. With reference to FIG. 5, the coupling assembly 16' may incorporate structural features similar to those shown in FIGS. 6-8, in which the coupling assembly is referenced by either 16' or 16". With further reference to FIG. 4, coupling 16 may include a spring biased plunger 51, which when axially disposed inwardly towards an interior portion 53 of the second component 22 will serve to release the one or, preferably, two outwardly extending, oppositely disposed locking members 62 from their normally biased outwardly extending locking orientation. In a preferred embodiment of the present invention, the locking members 62 will comprise an elongated finger configuration as illustrated in FIGS. 6-8. However, it is anticipated that the present invention may encompass other configurations of locking members 62, including but not limited too, ball bearings, wedge shaped, cone shaped, etc. Release of the locking members 62 from their normally biased outwardly extending locking orientation will allow attachment of the first coupling component 18 to the second coupling component 22.

For purposes of clarity the structural details of the preferred embodiments of FIG. 6-8, are explained with reference to coupling assemblies 16' and 16" as indicated in the aforementioned Figures. It is again to be emphasized that the structural components of the coupling assemblies 16' and 16" may be similar. One similarity between the different embodiments of FIG. 6-8 is the ability to accomplish a quick and efficient attachment and release of the components of the respective coupling assemblies 16' and 16", such as while utilizing only a single hand of the user. Further, attachment can be accomplished without the physical depression or other manipulation of the spring biased plunger 51 or any similar component.

More specifically, a feature of the embodiment of the coupling assembly 16' of FIG. 6 as well as the additional preferred embodiment 16" of FIGS. 7 and 8 is the inclusion of one or, preferably, two locking members 62 having an outer surface specifically configured to facilitate the quick and efficient attachment or release of the first component 18' to or from the second component 22'. In particular, each of the locking members 62 includes a leading surface portion 65 and a trailing surface portion 67. The locking members 62, as shown in FIG. 6, are disposed in their normally biased outwardly extending locking orientation between the first component 18' and the second component 22'. Furthermore, the trailing surface portions 67 of each of the locking members 62 are configured into a transverse, linear shape so as define a stop member which will prevent unwanted detachment of the first and second components 18' and 22' from one another such as when they are pulled away from one another by the strain of the animal or other forces. As such, it is necessary to affirmatively dispose the locking members 62 inwardly into the interior of the first component 18' in order to define a retracted orientation and allow passage of the leading end 64 of component 18' through the receiving aperture as at 69 formed in the second component 22'.

Looking in greater detail, the coupling assembly 16' comprises a first component 18' and a second component 22' which, as shown, are respectively configured to define a male coupling component and a female coupling component. At least one, preferably the male coupling component, is preferably structured to rotate or swivel, thereby allowing the entire coupling assembly 16' to be rotatable and swivelable to prevent tangling and the like. As explained above, the first component 18' may be connected to the distal or free end of the lead 10 and, more specifically, in direct operative attachment to the release structure, which in one preferred embodiment comprises an interior, axially moveable release cable 24. The release cable 24 may be connected directly to a plunger 60 so as to exert an axially directed force thereon which in turn permits the easy release of the first component 18' from the second component 22' by virtue of the fact that an axially directed pulling force will cause the plunger 60 to move outwardly against a force exerted thereon by a biasing spring (not shown). This outward movement of the plunger 60 will in turn cause the locking members 62 to be released from their normally biased outwardly extending locking orientation and pulled into a retracted orientation, thereby allowing the first component 18' to be easily released from the second component 22'.

In an alternate embodiment of the coupling assembly 16", as illustrated in FIGS. 7 and 8, the locking members 62' and the second component 22' may comprise oppositely charged magnetic materials, such that the attractive and/or repulsive magnetic forces are sufficient to maintain the locking members 62' in their normally biased outwardly extending locking orientation. In this embodiment, the plunger 60 is connected to each locking member 62', wherein an outward axial force is required to reposition the locking members 62' from their normally biased outwardly extending locking orientation to the retracted orientation, so as to allow the first component 18' to be easily released from the second component 22'.

In yet another embodiment of the coupling assembly 16''', the locking members 62' may in whole or in part comprise a magnetically charged material. Additionally, the release structure comprises an electromagnet which replaces the release cable 24 and plunger 60 and generates a stronger, similarly polarized magnetic field relative to the locking members 62' such that the repulsive magnetic forces are sufficient to force the locking members 62' into their normally biased outwardly extending locking orientation. To release the first component 18' from the second component 22' in this embodiment of the present invention, an electrical current may be applied to the electromagnet which reverses its polarity, thus causing the locking members 62' to be pulled into a retracted orientation by magnetic attraction which permits the first component 18' to be automatically detached from the second component 22'. In such an embodiment, an independent biasing force on the locking members 62 may not be necessary.

A further embodiment of the present invention incorporates an electromotive release mechanism 160 comprising an actuation member 162 and being disposed in an operative association with at least one, but preferably a plurality of locking members 62', as shown in FIGS. 25A through 28B. In particular, the operative association is at least partially defined by the electromotive release mechanism 160 being structured to normally dispose the locking members 62' into an outwardly extending locking orientation. The operative association is further defined by the electromotive release mechanism 160 being further structured to selectively dispose the locking members 62' into the retracted orientation, upon actuation of the electromotive release mechanism 160, such that a first component 18' and a corresponding second component 22' of the coupling assembly 16' are detached from one another.

Figure 25A:
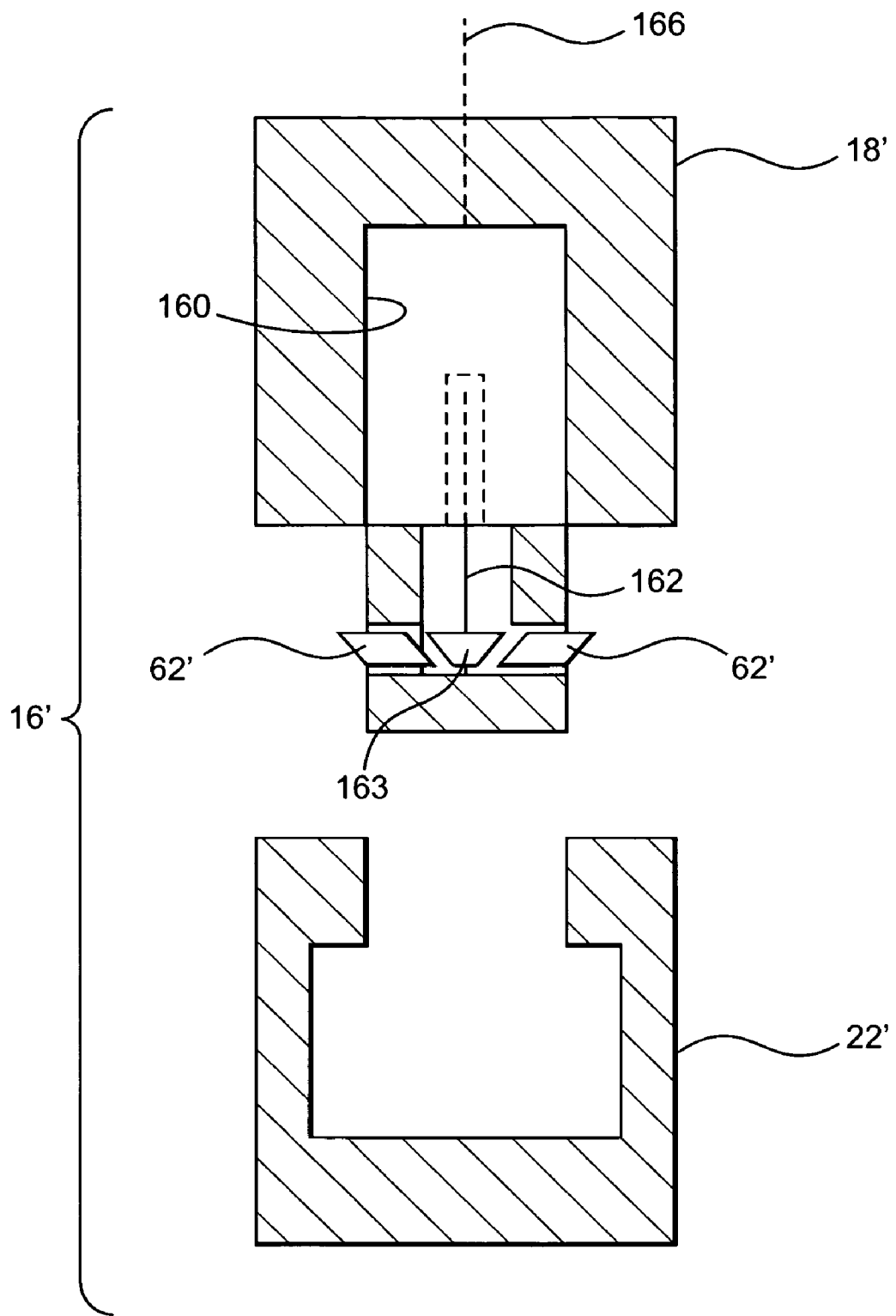
FIG. 25A is a partially exploded cross-sectional view of one preferred embodiment of the quick connect coupling assembly of the present invention comprising an electromotive release mechanism and illustrating a pair of locking members in an outwardly extending locking orientation.
Figure 25B:
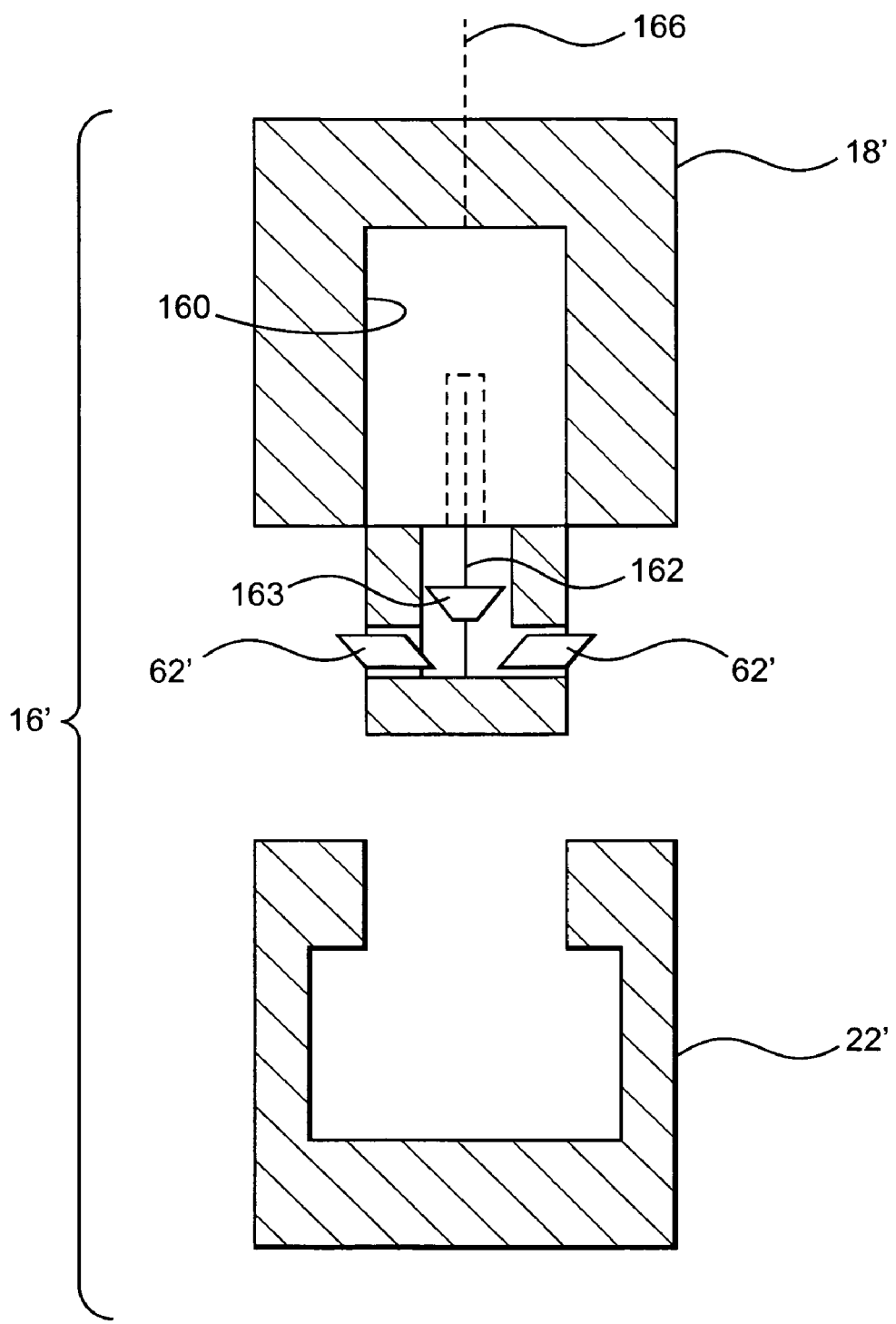
FIG. 25B is a partially exploded cross-sectional view of the embodiment of FIG. 25A illustrating the pair of locking members in a retracted orientation.
Figure 26A:
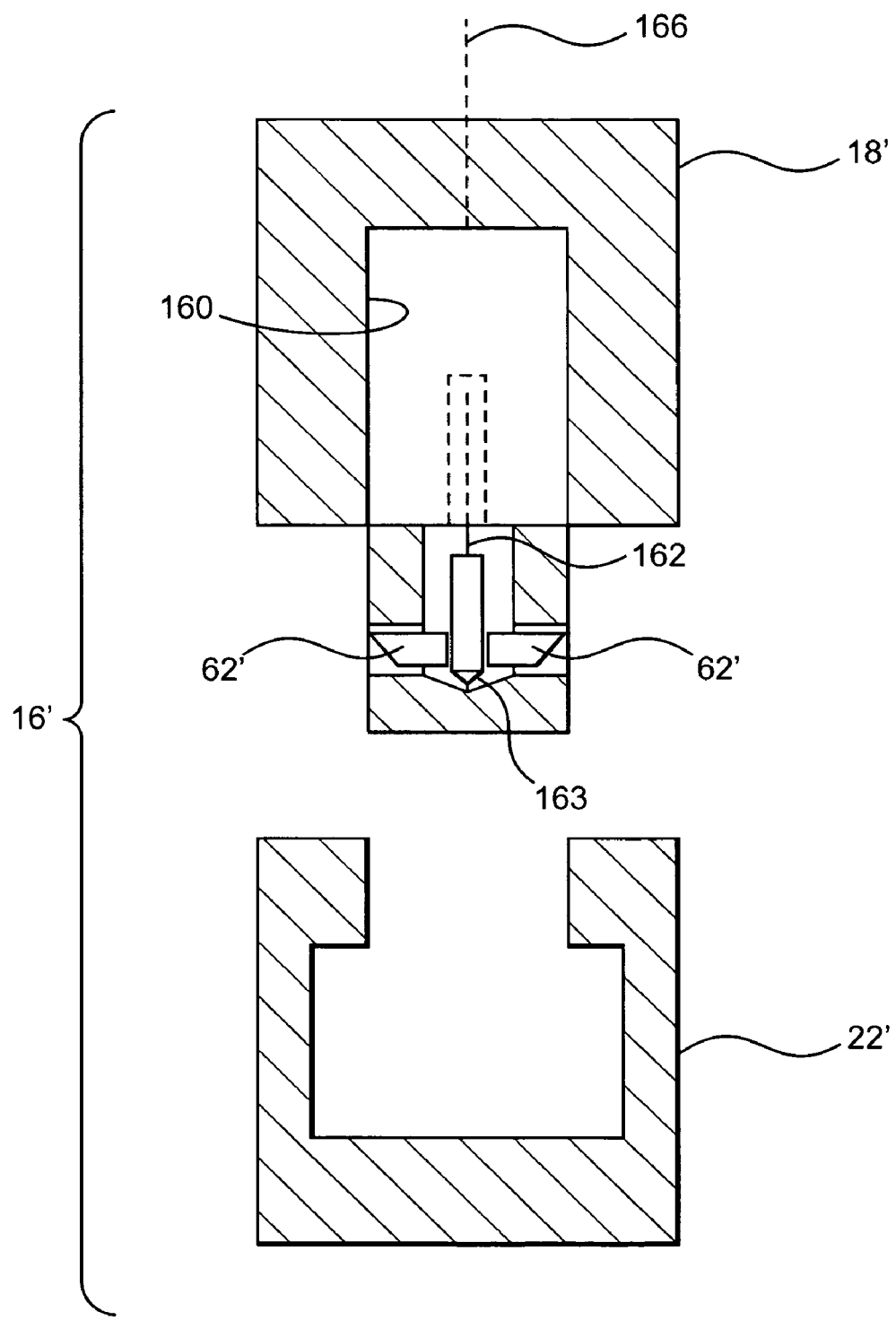
FIG. 26A is a partially exploded cross-sectional view of another preferred embodiment of the quick connect coupling assembly of the present invention incorporating an electromotive release mechanism, specifically, a rotary solenoid, and illustrating a pair of locking members in a retracted orientation.
Figure 26B:
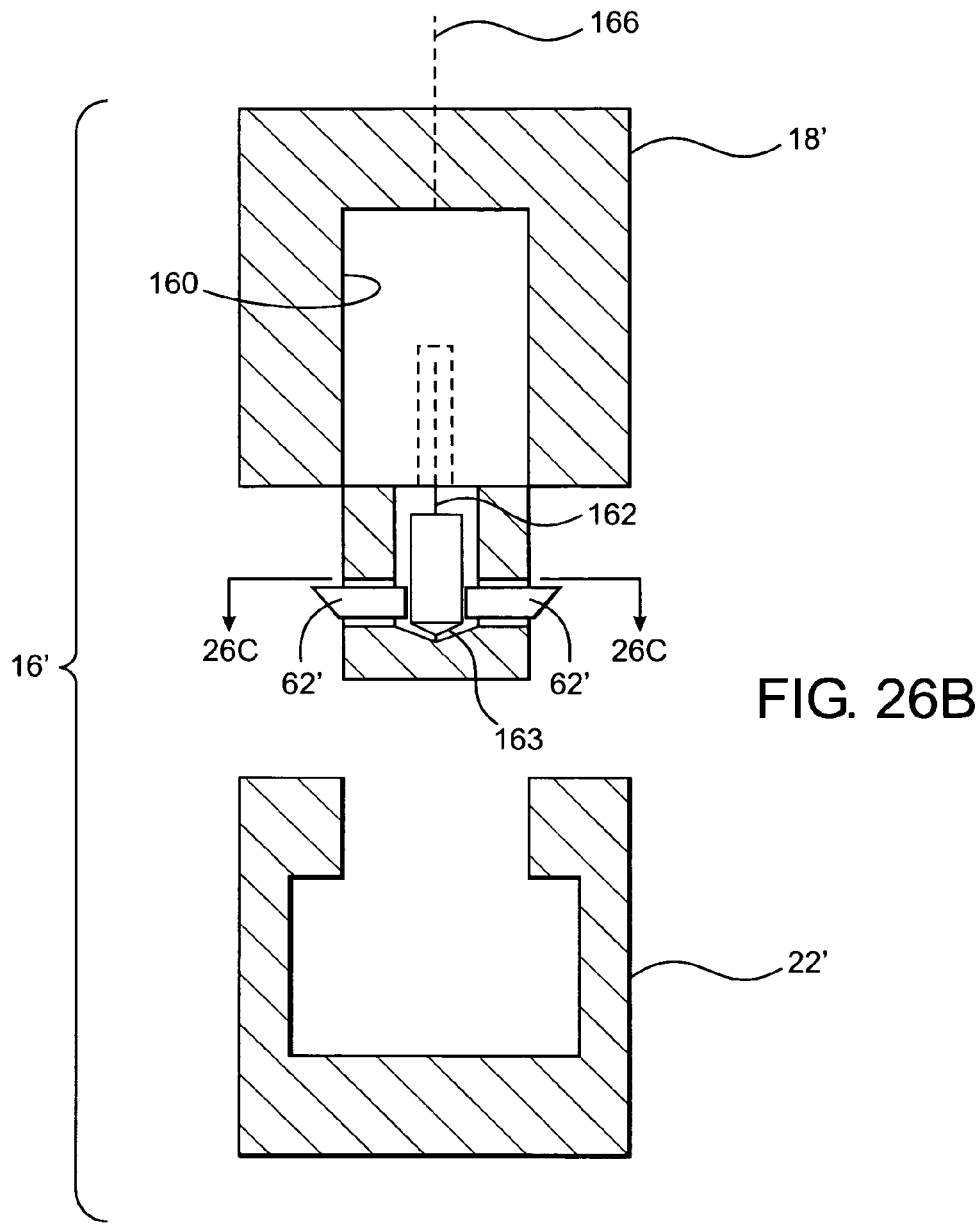
FIG. 26B is a partially exploded cross-sectional view of the embodiment of FIG. 26A illustrating the pair of locking members in an outwardly extending locking orientation.
Figure 28A:
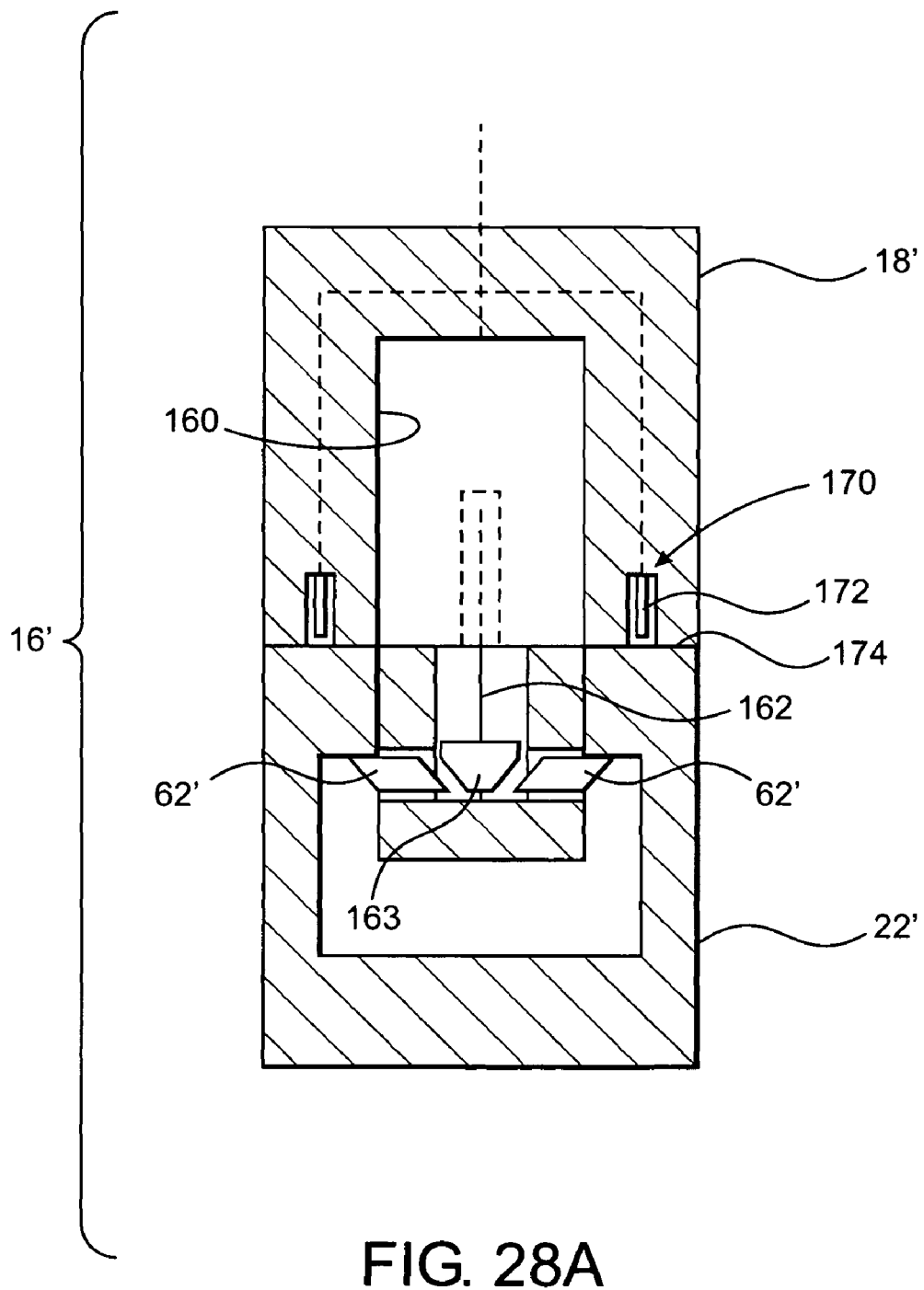
FIG. 28A is a partially exploded cross-sectional view of one preferred embodiment of the quick connect coupling assembly of the present invention comprising an electromotive release mechanism and an electromotive propulsion mechanism illustrating a pair of propulsion members disposed in a secured configuration.
Figure 28B:
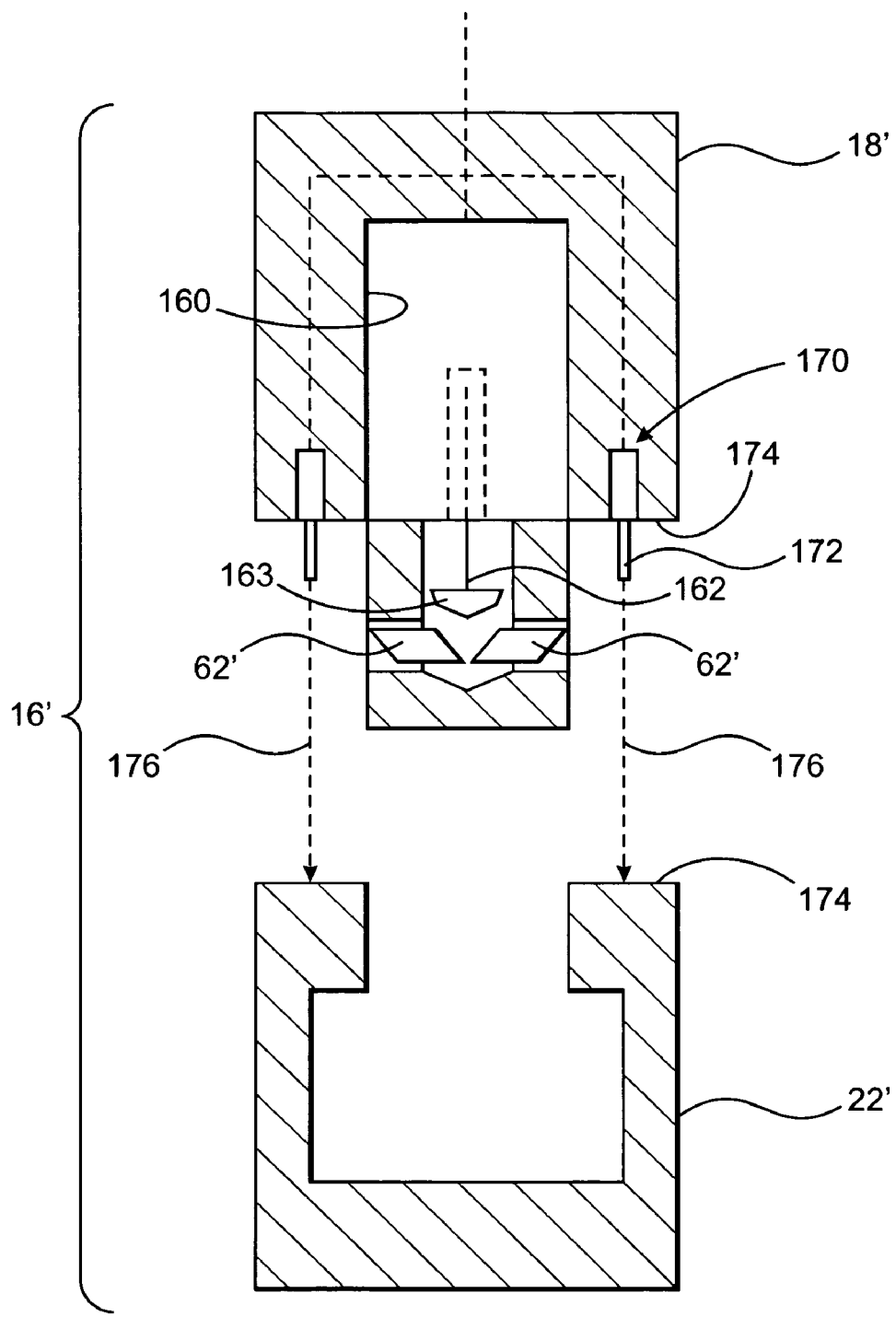
FIG. 28B is a partially exploded cross-sectional view of the embodiment of FIG. 28A illustrating the pair of propulsion members in a separated configuration.

More specifically, in at least one preferred embodiment, the actuation member 162 of the electromotive release mechanism 160 comprises a distal portion 163 structured to normally dispose the locking members 62' in the outwardly extending locking orientation, such as, for example, via displacement of the locking members 62', as illustrated in FIGS. 25A, 26B, and 28A. Additionally, the distal portion 163 of the actuation member 162 is structured to selectively dispose the locking members 62' into a retracted orientation, thereby permitting the first component 18' and the second component 22' of the coupling assembly 16' to be detached from one another. The distal portion 163 of the actuation member 162 is movably disposable between an extended displacement configuration such that the locking members 62' are disposed in the outwardly extending locking orientation, as illustrated in FIGS. 25A and 28A, and a retracted non-displacement configuration such that the locking members 62' are disposed in the retracted orientation, as illustrated in FIGS. 25B and 28B. In at least one alternate embodiment, the distal portion 163 may comprise a magnetically charged material, such as, by way of example only, an electromagnetic, so as to further facilitate positioning the locking members 62' between the outwardly extending locking orientation and the retracted orientation.

Figure 26C:
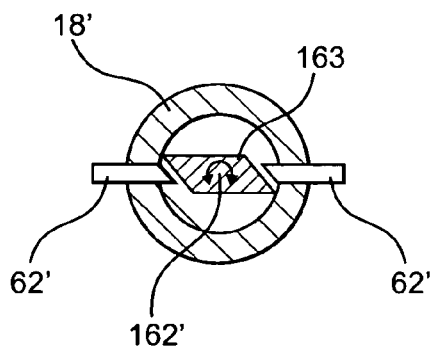
FIG. 26C is a partial cross-sectional plan view of the first component of the embodiment of FIG. 26B, along lines 26C-26C thereof.

In one further embodiment, the distal portion 163 is movably disposable between a non-displacement configuration such that the locking members 62' are disposed in the retracted orientation, as illustrated in FIG. 26A and a displacement configuration such that the locking members 62' are disposed in the outwardly extending locking orientation, as illustrated in FIG. 26B. In this embodiment, the actuation member 162 is structured to rotate about an actuation axis 162', as illustrated in FIG. 26C, wherein the required rotation may be accomplished by way of an electromotive release mechanism 160 comprising a rotary solenoid.

Figure 27A:
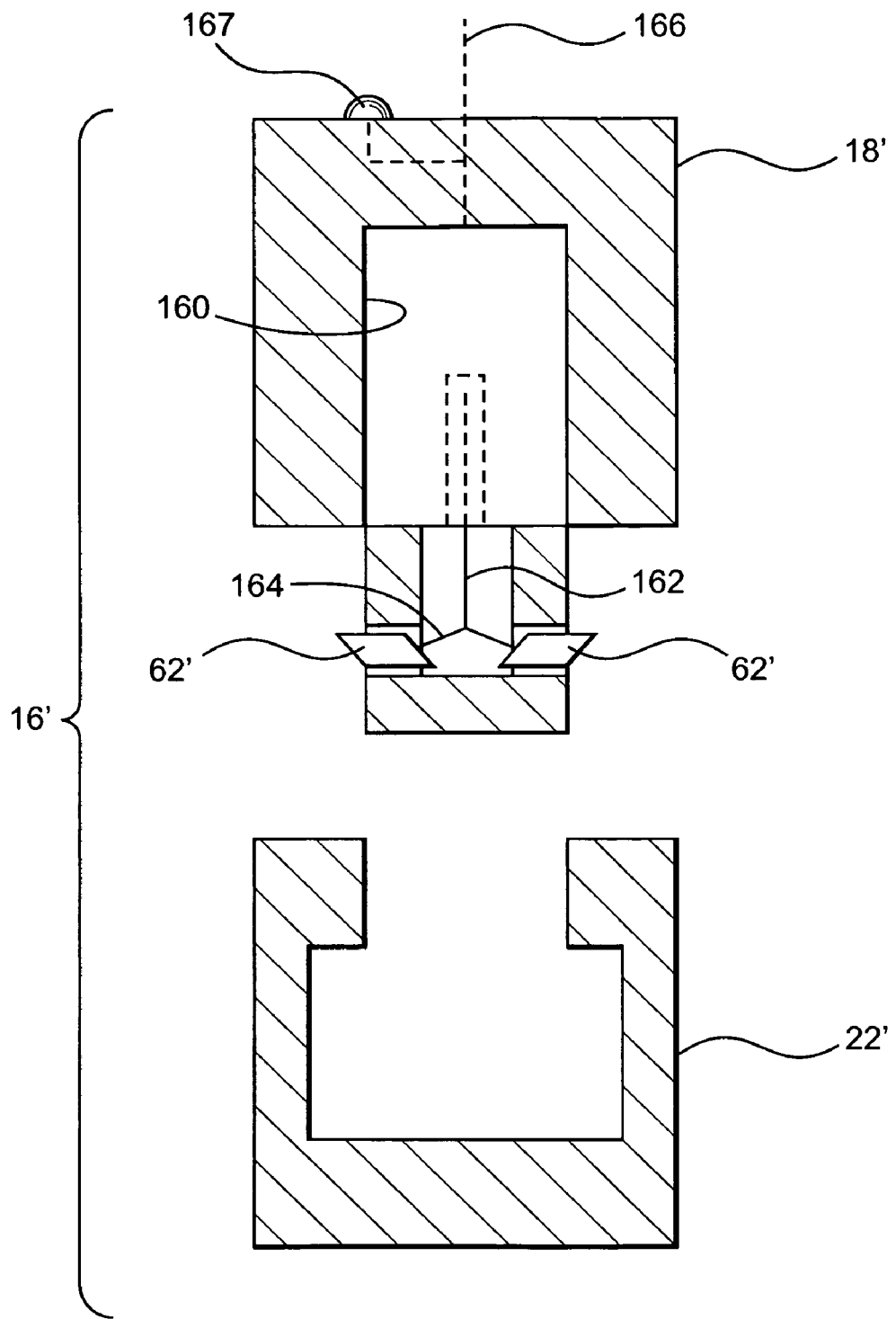
FIG. 27A is a partially exploded cross-sectional view of another embodiment of the quick connect coupling assembly of the present invention comprising a manual release mechanism and illustrating a pair of locking members in an outwardly extending locking orientation.
Figure 27B:
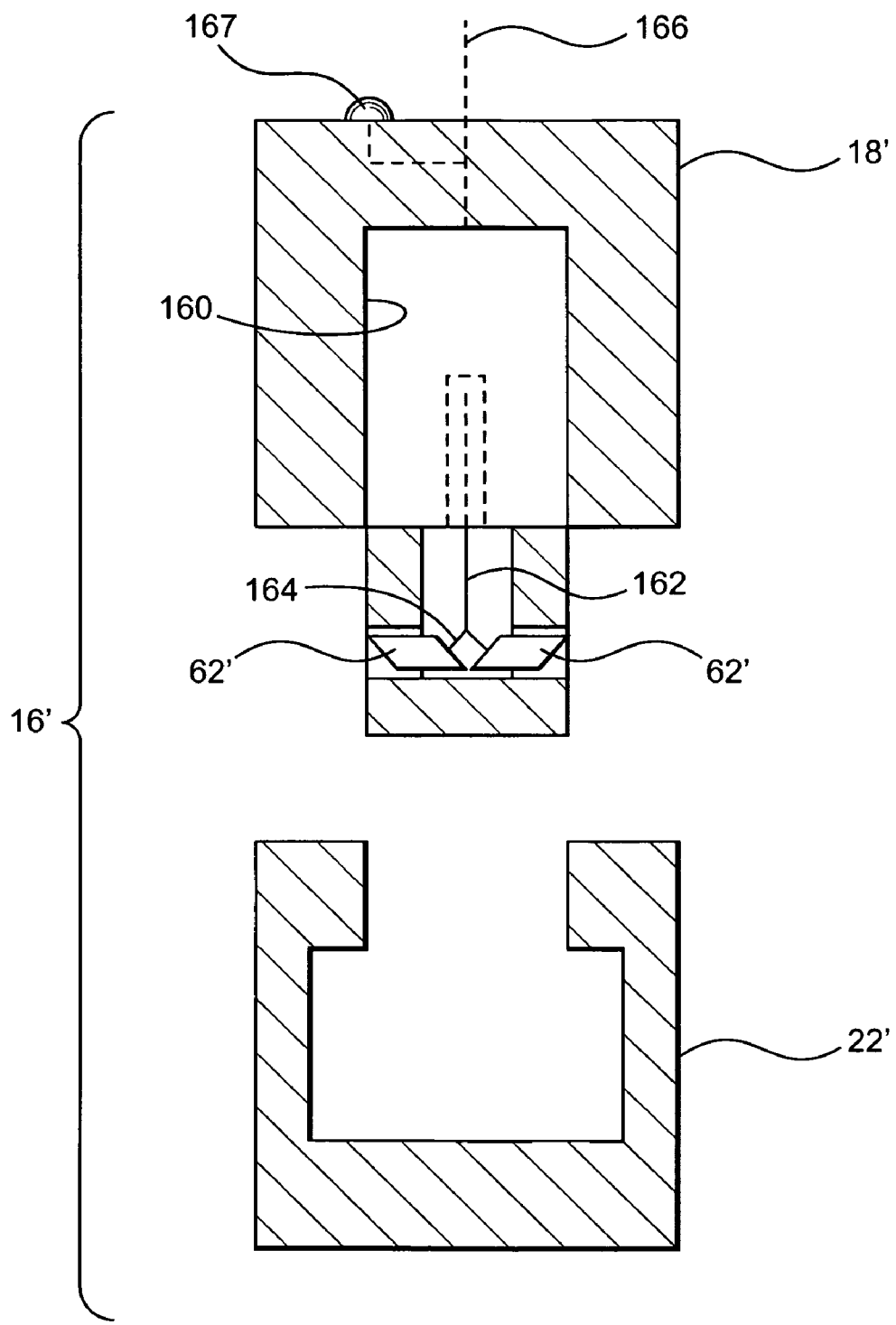
FIG. 27B is a partially exploded cross-sectional view of the preferred embodiment of FIG. 27A illustrating the pair of locking members in a retracted orientation.

In yet one other embodiment, the electromotive release mechanism 160 may comprise at least one interconnecting member 164 disposed between the actuation member 162 and each locking member 62'. As shown in FIGS. 27A and 27B, the electromotive release mechanism 160 may comprise a plurality of interconnecting members 164, such as a wire or a cable, wherein the interconnecting members 164 are structured to dispose the locking members 62' between the outwardly extending locking orientation and the retracted orientation upon repositioning of the actuation member 162, as illustrated. In at least one embodiment, the interconnecting members 164 comprise a shape memory alloy component structured to dispose the locking members 62' from the outwardly extending locking orientation to the retracted orientation upon actuation of the electromotive release mechanism 160. Specifically, actuation of the electromotive release mechanism 160 results in an electrical current being at least temporarily applied to the shape memory alloy component, thereby altering its physical configuration and causing the locking members 62' to be reoriented.

The electromotive release mechanism 160 may comprise any one of a number of electrically actuated devices including, by way of example only and in no manner limited to, solenoids, transformers, electromagnets, capacitors, electric motors, shape memory alloy components, magnetic propulsion devices, etc. Looking just at solenoids, the electromotive release mechanism 160 may comprise a plunger type solenoid, a hammer type solenoid, a swing solenoid, a rotary solenoid, a tubular type solenoid, etc., and these are only a few of the possible types of solenoids illustrative of those which may be comprised by the electromotive release mechanism 160 of the present invention. As such, it is understood that any electromotive device comprising an actuation member 162 which may effect the disposition of the locking members 62' between the outwardly extending locking orientation and the retracted orientation upon application of an electrical current, may be utilized and are encompassed in the scope of the present invention.

To facilitate actuation of the electromotive release mechanism 160, an actuation interface 166 is provided and is structured to facilitate selective actuation of the electromotive release mechanism 160, via selective application of an electrical current to the electromotive release mechanism 160, as desired by the user. The actuation interface 166 may comprise a direct interconnection to the activation assembly 80 or 82 such as, for example, an electrical wire extending along the lead 10 between the rechargeable power supply 81' of the activation assembly 80 or 82 and the electromotive release mechanism 160. As such, a selective activation member 44', as described herein, may be utilized to selectively actuate the electromotive release mechanism 160 via selective application of an electrical current from the rechargeable power supply 81'.

In at least one embodiment, the actuation interface 166 is disposed in a communicative relationship with a voice activated control module 110, also as described herein, thereby allowing the electromotive release mechanism 160 to be remotely actuated. One further embodiment of the present invention comprises a manual release mechanism 167 interconnected to the actuation interface 166, as illustrated in FIGS. 27A and 27B, the manual release mechanism 167 structured to permit manual actuation of the electromotive release mechanism 160, thereby allowing the first component 18' and the second component 22' to be quickly and easily detached from one another.

Also as indicated, a further feature of the present invention is its ability to achieve easy and effective engagement or attachment between the first component 18' and the second component 22'. This attachment is preferably facilitated by virtue of the fact that the leading surface portion 65 of each of the locking members 62 has a substantially convergent configuration which extends outwardly in either a curvilinear or sloped shape. Accordingly, engagement of the leading surface portion 65 with the periphery of the receiving aperture 69 will cause a sliding engagement of the respective locking members 62 relative to the periphery of the receiving aperture 69 and thereby cause a forced, inward retraction of the locking members 62 to counter their normally biased outwardly extending locking orientation. The leading end 64 of the first component 18' will thereby be allowed to pass through the receiving aperture 69 into the engaged and attached position as shown in FIGS. 6 and 8 in a substantially facilitated manner.

In order to accomplish such quick and easy attachment of the components 18' and 22' together into the attached position of FIGS. 6 and 8, the first and second components 18' and 22' should be disposed in predetermined aligned engagement with one another. Such predetermined aligned engagement may be defined by an axial alignment of the first component 18' with the second component 22' as best shown in FIG. 7. Once the first and second components 18' and 22' are in the aforementioned axial alignment, forced positioning of these two components 18' and 22' towards one another as indicated by directional arrows 70 and 71 will cause sliding contact of the leading surface portion 65 with the periphery of the receiving aperture 69 resulting in the predetermined aligned engagement of the first and second components 18' and 22'. The cooperatively structured configuration of the first and second components 18' and 22' of the preferred embodiment of the coupling assembly 16' allows the predetermined aligned engagement and attachment of the first and second components 18' and 22' by the user with a single hand.

As set forth above in order to accomplish a quick and easy attachment of the components 18' and 22' to one another in the locked position of FIGS. 6 and 8, the first and second components 18' and 22' are disposed in axial alignment with one another. To further assist the axial alignment of the first and second components 18' and 22', each of the embodiments of FIGS. 6 through 8 also preferably include an attraction assembly 75 which facilitates the axial alignment and automatic attachment of the components 18' and 22' to one another. Such an attraction assembly 75 is mounted on the coupling assembly 16' in the form of correspondingly positioned, attractive, mating or engaging surfaces. In the embodiment of illustrated FIG. 6, the attraction assembly 75 includes at least the exposed annular surface 72 of the first component 18' being formed of a magnetic material and configured to attract a similar annular surface 74 of the second component 22', also formed of a magnetic material. In the locking position of FIG. 6, these magnetically attractive surfaces 72 and 74 will normally be brought into confronting engagement with one another. The provision of the magnetically attractive surfaces 72 and 74 and their relative disposition to one another will facilitate the axial alignment of the components 18' and 22' as well as the inwardly directed connecting force indicated by directional arrows 70 and 71 such that the first and second components 18' and 22' are automatically attached. In at least one embodiment, the attraction assembly 75 utilizes magnetic propulsion to achieve automatic attachment of the first and second components 18' and 22' by including an array of magnetic surfaces 72 or 74 having alternating polarities, or an array of magnetic surfaces 72 or 74 having similar polarities but exhibiting progressively stronger or weaker magnetic forces.

In the embodiment of FIG. 6, the magnetically attractive surfaces 72 and 74 are substantially externally located when the first and second components 18' and 22' are separated from one another. Conversely, the additional preferred embodiment of FIGS. 7 and 8 includes the magnetically attractive surfaces 78 and 79 disposed substantially interiorly but in the respective position of the first component 18' with the second component 22' as shown in FIG. 8.

In addition, the attraction assembly 75 of the embodiment of FIG. 8 may also include interior side surfaces as at 82' which are designed to at least partially engage and cause the direct attraction of the locking members 62'. Accordingly, in the embodiment of FIG. 8 the locking members 62' are at least partially formed of a magnetically attractive material so as to facilitate the aforementioned predetermined aligned engagement of the first and second components 18' and 22' with one another. Further, the magnetically attractive surfaces may be utilized to cause the first and second components 18' and 22' to automatically engage and attach to one another when disposed in the predetermined aligned relationship.

In addition to the ability to achieve easy and effective engagement or attachment of the components of the coupling assembly 16', at least one embodiment of present invention comprises an electromotive propulsion mechanism 170, as illustrated in FIGS. 28A and 28B, structured to at least temporarily impart a separation force between the first component 18' and the second component 22'. More in particular, the electromotive propulsion mechanism 170 of the present invention comprises at least one propulsion member 172, however, in one preferred embodiment, the electromotive propulsion mechanism 170 comprises a plurality of propulsion members 172 disposed in a spaced apart relation to one another, as illustrated in FIGS. 28A and 28B. The propulsion members 172 preferably comprise an elongated configuration, as illustrated, and are disposed adjacent a propulsion interface 174 formed between abutting portions of the first component 18' and the second component 22' of the coupling assembly 16', as best shown in FIG. 28A.

The electromotive propulsion mechanism 170 of the present invention is specifically structured to dispose the propulsion members 172 between a secured configuration and a separated configuration. Specifically, the secured configuration is at least partially defined by the propulsion members 172 being disposed in an inwardly retracted position by the electromotive propulsion mechanism 170, as illustrated in FIG. 28A. Conversely, the separated configuration is at least partially defined by the propulsion members 172 being disposed in an outwardly extended position by the electromotive propulsion mechanism 170, as illustrated in FIG. 28B. The disposition of the propulsion members 172 from the secured configuration to the separated configuration results in a separation force between the first component 18' and the second component 22' of the coupling assembly 16' in a direction substantially normal to the propulsion interface 174, as indicated by directional arrows 176 in FIG. 28B. The separation force is sufficient to cause the first component 18' and the second component 22' to detach from one another when each of the plurality of locking members 62' is disposed in the retracted orientation.

Similar to the electromotive release mechanism 160 previously described, the electromotive propulsion mechanism 170 of the present invention may comprise any one of a number of electrically actuated devices including, by way of example only and in no manner limited to, solenoids, transformers, electromagnets, capacitors, electric motors, shape memory alloy components, magnetic propulsion devices, etc. As before, it is understood that any electromotive device which may effect the disposition of the propulsion members 172 between the secured configuration and the separated configuration upon application of an electrical current may be utilized and are encompassed in the scope of the present invention.

To assure that locking members 62' are disposed in the retracted orientation prior to disposition of the propulsion members 172 into the separated configuration, so as to prevent jamming of the locking members 62' in the interior of the second component 22', at least one embodiment of the present invention comprises a time sequence module. The time sequence module is structured such that actuation of the electromotive release mechanism 160 effecting retraction of the locking members 62' must occur a preselected period of time before the electromotive propulsion mechanism 170 is permitted to operate to dispose the propulsion members 172 into the separated configuration. The preselected period of time is determined by the amount of time required for the locking members 62' to fully retract after actuation of the electromotive release mechanism 160.

In at least one embodiment, the electromotive propulsion mechanism 170 may comprise an attraction mechanism, such as, for example, an electromagnet, structured to be actuated by the time sequence module upon disposition of each of the propulsion members 172 from the outwardly extended position into an at least partially inwardly retracted position. Specifically, the disposition of each of the propulsion members 172 into an at least partially inwardly retracted position is indicative of the second component 22' being disposed in proximity to the first component 16' in predetermined aligned engagement, and the attraction mechanism is thus structured to facilitate quick and easy connection of the components of the coupling assembly 16' by imparting an attraction force between the components.

Figure 29:
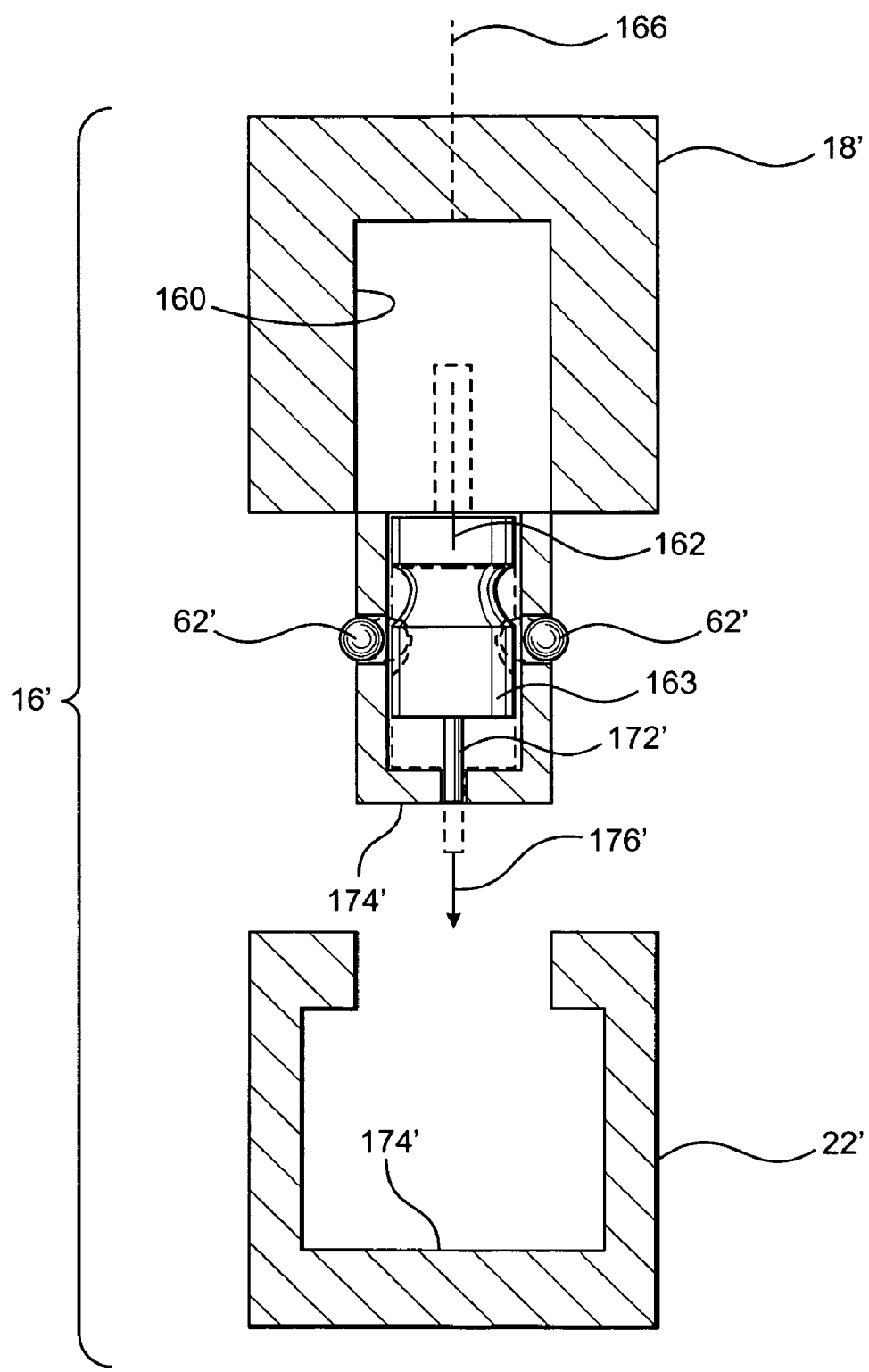
FIG. 29 is a partially exploded cross-sectional view of one other embodiment of a quick connect coupling assembly having an electromotive release mechanism comprising a propulsion member.

A further embodiment of the present invention is illustrated in FIG. 29 and includes an electromotive release mechanism 160 having an actuation member 162 comprising a propulsion member 172'. In this embodiment, the electromotive release mechanism 160, more specifically, the actuation member 162, is structured to dispose the propulsion member 172' between a secured configuration and a separated configuration via disposition of a distal portion 163 of the actuation member 162 between a displacement configuration and a non-displacement configuration, respectively. As shown, the propulsion member 172' is structured to extend through a portion of the first component 18' and to contact an inner portion of the second component 22', thereby exerting a separation force in a direction substantially normal to a propulsion interface 174', as indicated by directional arrow 176'. The separation force is sufficient to cause the first component 18' and the second component 22' to detach from one another when each of the plurality of locking members 62' is disposed in the retracted orientation.

Figure 31:
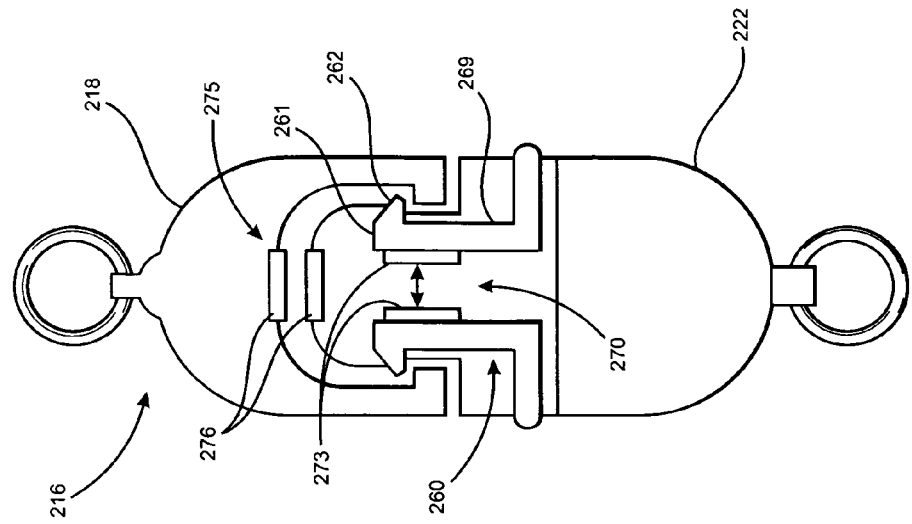
FIG. 31 is a partial cutaway view of the embodiment of FIG. 30 disposed in an attached orientation.
Figure 30:
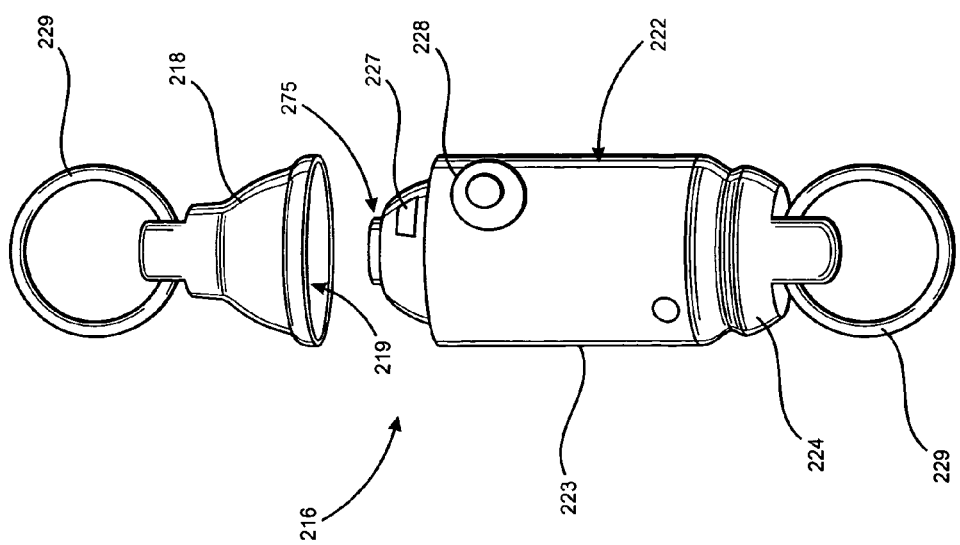
FIG. 30 is perspective view of one further preferred embodiment of a quick connect coupling assembly disposed in a detached orientation in accordance with the present application.
Figure 32:
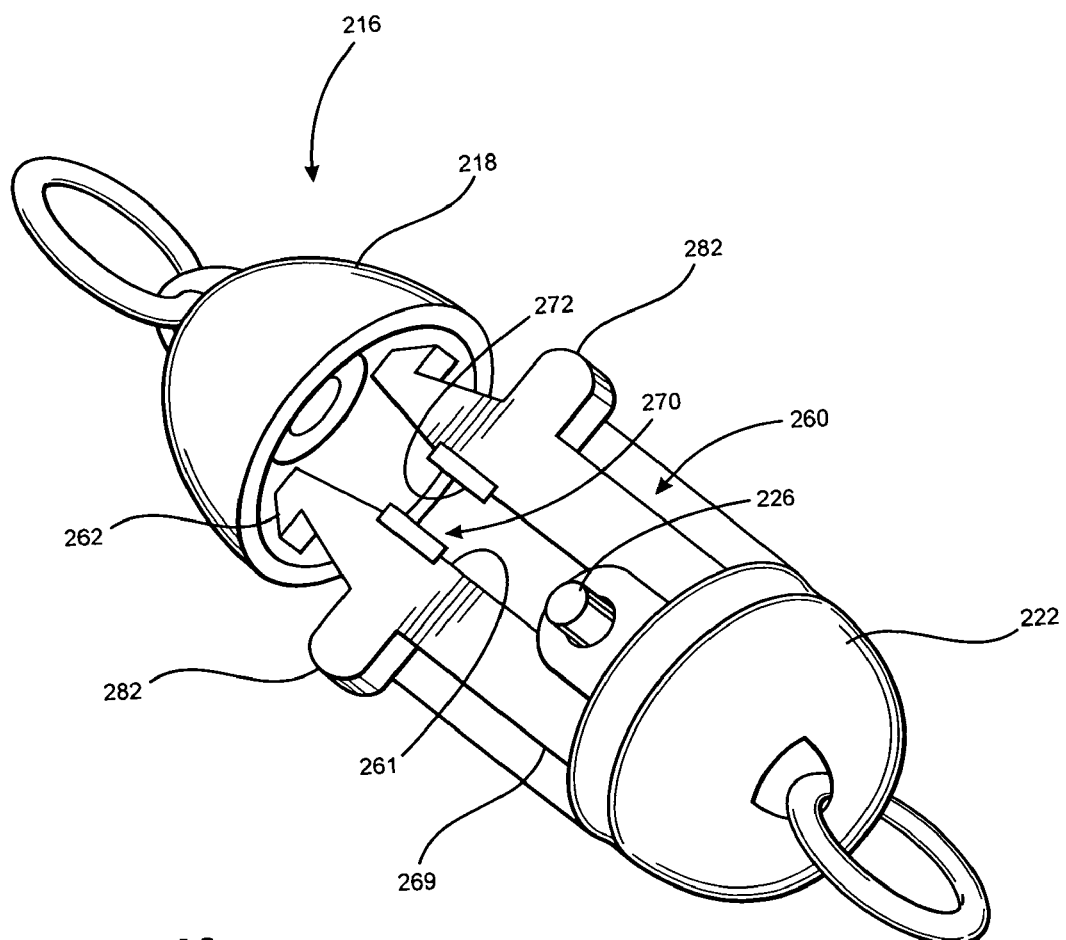
FIG. 32 is partial cutaway perspective view of yet another preferred embodiment of a quick connect coupling assembly in accordance with the present application.

FIG. 30 presents a perspective view of yet another illustrative embodiment of a quick coupling assembly, generally as shown at 216, in accordance with the present invention. As above, the quick connect coupling assembly 216 is structured to allow quick connection and quick release, and includes a first component 222 and a second component 218 which are cooperatively structured to assume an attached orientation, such as is illustrated in FIG. 31, and a detached orientation, as in FIG. 30. The first component 222 and the second component 218 of the quick connect coupling assembly 216 of this embodiment may comprise any of a variety of materials of construction, which will typically be dictated by the load to be placed on the assembly 216 in a particular application. For example, in a light duty application, such as securing a small pet or a simple key chain, the first component 222 and the second component 218 may comprise plastic, aluminum, or another lightweight material for ease of carrying on a pet or by a person, while permitting secure attachment of the components. Alternatively, for heavy duty applications, the first component 222 and second component 218 may be constructed of hardened steel, stainless steel, or any one of a number of other metals, metal alloys, or specialty materials to assure secure attachment is maintained between the components for the specific application.

Figure 40:
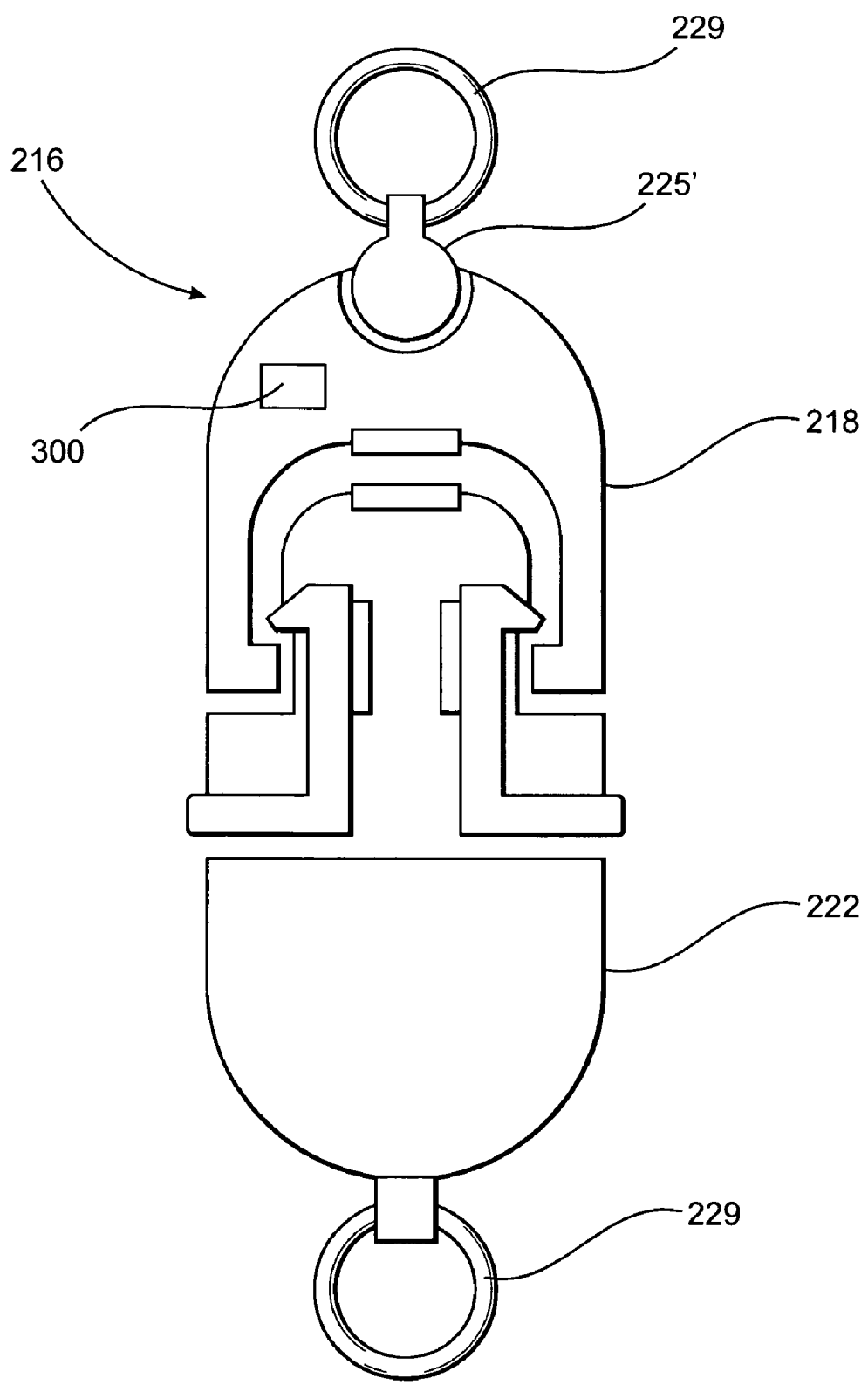
FIG. 40 is a partial cutaway view of a quick connect coupling assembly illustrating a swivel member comprising a ball and socket type interconnection.

The quick connect coupling assembly 216 of the present invention may also be structured such that at least a portion is movable relative to an object attached thereto, such as via an attachment portion 229, so as to prevent or at least minimize tangles in a line, rope, wire, etc., attaching the assembly 216 to the object. As illustrated in the figures, in at least one embodiment, the first component 222 comprises a fixed portion 223 and a moveable portion 224, wherein the moveable portion 224 is movably interconnected to the fixed portion 223. In one preferred embodiment, the moveable portion 224 is rotatably attached to the fixed portion 223, for example, via a swivel member 225, and is structured to swivel relative thereto, as illustrated best in FIG. 33A. In another embodiment, a swivel member 225' comprising a ball and socket type of interconnection, as illustrated in FIG. 40, is utilized to prevent tangling of an attached line or rope.

Figure 33B:
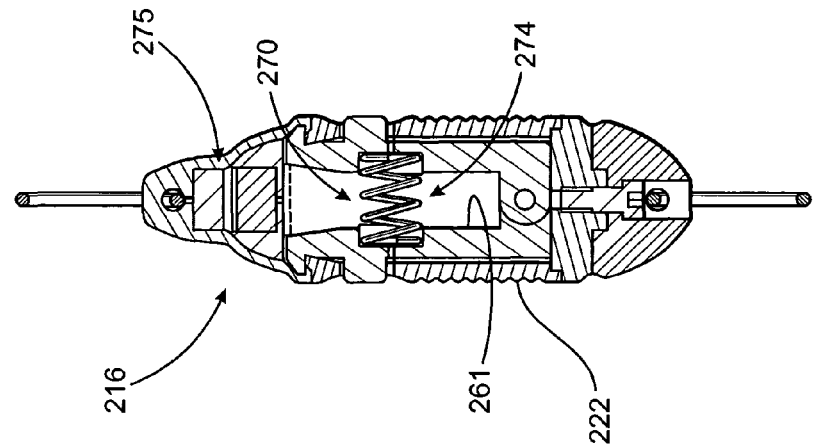
FIG. 33B is a cross-sectional view of the embodiment of FIG. 33 illustrating a biasing mechanism comprising a spring to maintain locking members in an outwardly extending locking orientation.
Figure 33A:
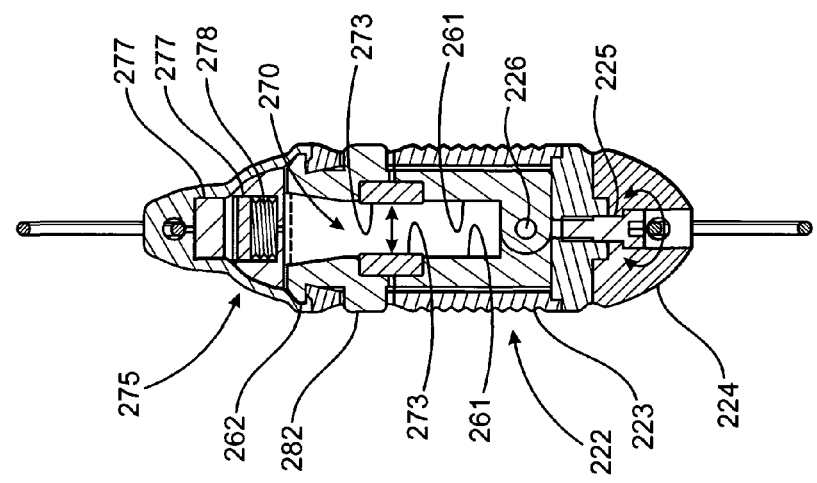
FIG. 33A is a cross-sectional view of the embodiment of FIG. 33 illustrating a biasing mechanism comprising a plurality of magnetic biasing elements to maintain locking members in an outwardly extending locking orientation.
Figure 33:
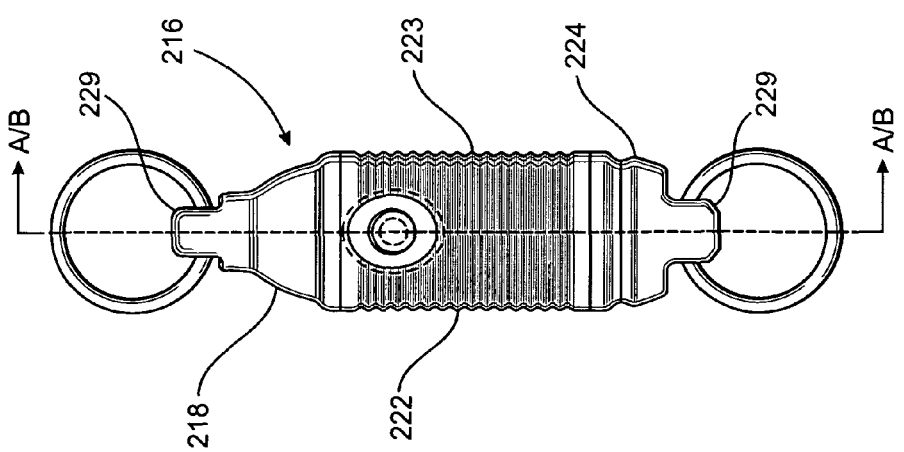
FIG. 33 is an elevation of a further preferred embodiment of a quick connect coupling assembly in accordance with the present application.
Figure 34:
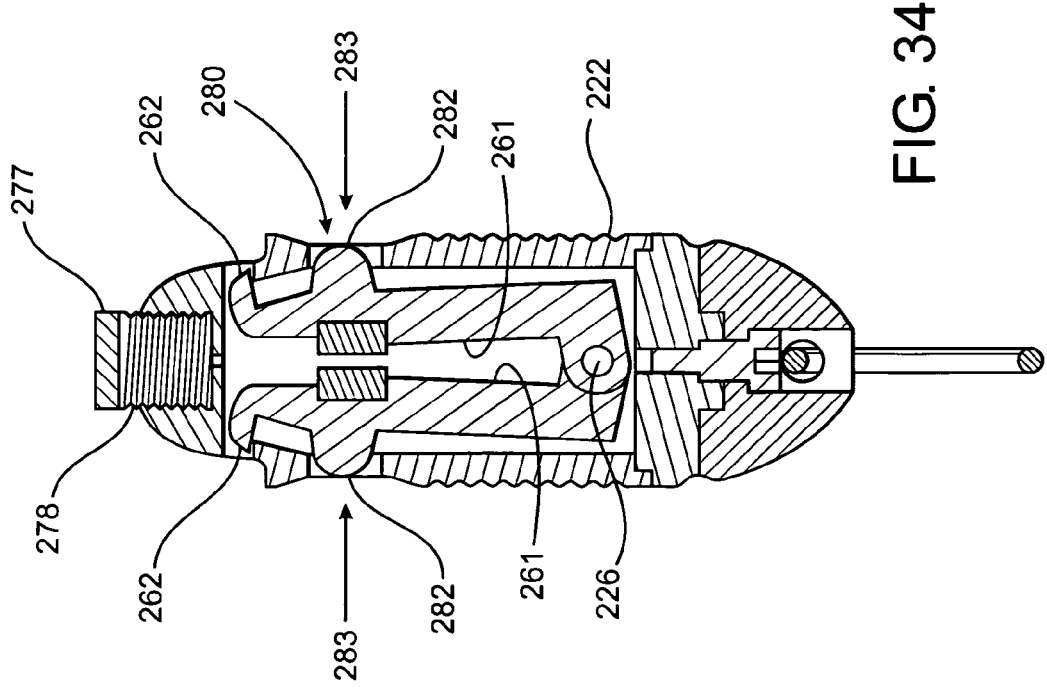
FIG. 34 is a partial cross-sectional view of the embodiment of FIG. 33A illustrating locking elements pivotably interconnected to a first component and a release mechanism disposed to temporarily allow locking members to be disposed in an inwardly retracted release orientation.
Figure 39:
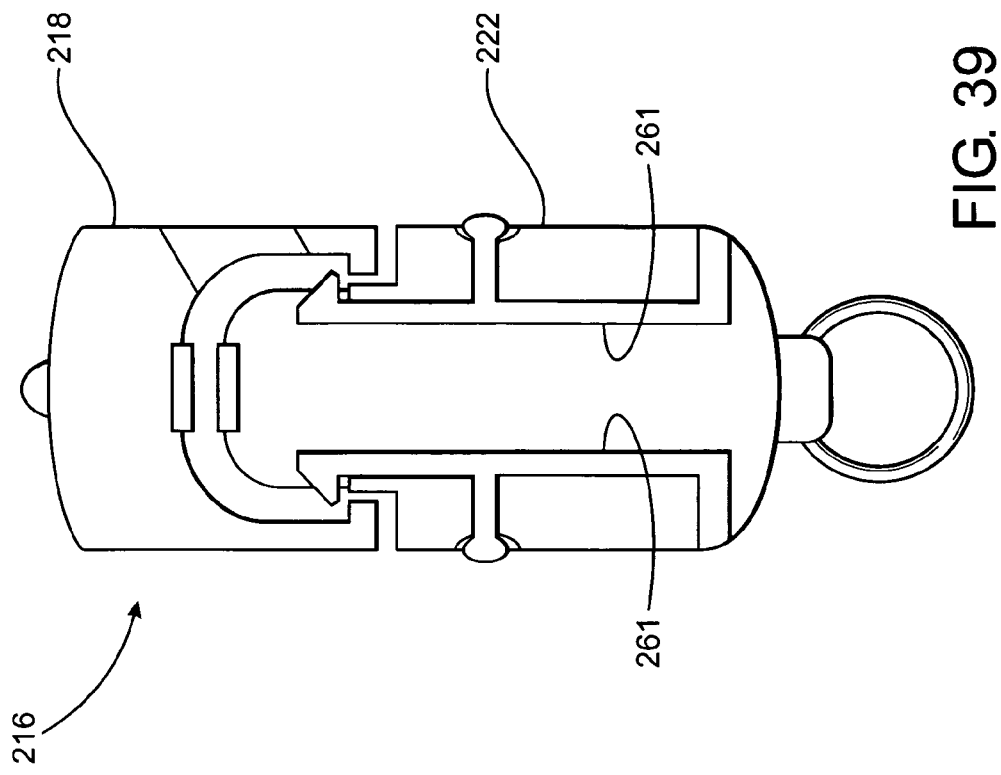
FIG. 39 is a partial cutaway view of an alternate embodiment comprising locking elements slidably interconnected to the first component.
Figure 38:
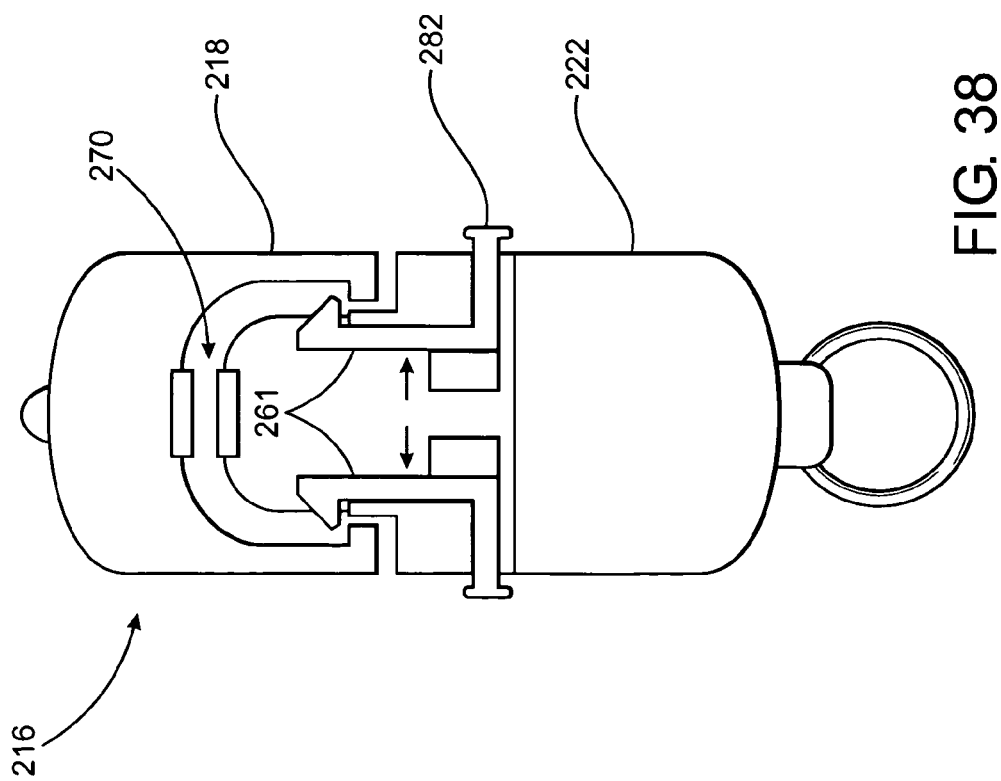
FIG. 38 is a partial cutaway view of yet another preferred embodiment of a quick connect coupling assembly in accordance with the present invention illustrating locking elements slidably interconnected to the first component.

The quick connect coupling assembly 216 also comprises a locking assembly 260 structured to retain the first component 222 and the second component 218 in an attached orientation, such as is illustrated, by way of example only, in FIG. 31. As further illustrated throughout the figures, the locking assembly 260 comprises at least one locking element 261, however, in the illustrative embodiments presented herein, the locking assembly 260 comprises a plurality of locking elements 261 being movably interconnected to the first component 222 of the quick connect coupling assembly 216. In one embodiment of the present invention, the locking elements 261 are structured and disposed in a sliding interconnection with the first component 222, as illustrated in FIGS. 31, 38, and 39, for example, in tracks or channels. More specifically, the sliding interconnection is defined such that the locking elements 261 are not physically attached to the first component 222, rather, they engage the first component 222 in such a manner so as to be "free floating" along or within the tracks or channels thereof. In another embodiment, as best shown in FIGS. 33A, 33B, and 34, the locking elements 261 are structured and disposed in a pivoting interconnection with the first component 222, such as, for example, about connection member 226.

In at least one embodiment, the locking elements 261 of the present invention preferably comprise a locking arm 269 having a locking member 262 disposed at one end thereof. In accordance with a preferred embodiment, the locking arms 269 comprise an elongated configuration having corresponding ones of the locking members 262 disposed at one end thereof. As will be appreciated from the various embodiments illustrated in the figures, however, the degree to which any particular locking arm 269 is elongated may vary considerably depending upon the internal configuration of the first component 222, and the manner in which the locking element 261 is disposed to engage the first component 222, such as, by way of example only, a sliding engagement or a pivoting engagement.

As in previously disclosed embodiments of a quick connect coupling assembly 216 in accordance with the present invention, the locking members 262 of the present embodiment are structured to be normally disposed and maintained in an outwardly extending locking orientation, as illustrated, by way of example, in FIGS. 31, 32, 33A, and 33B. In particular, the locking members 262 are structured to be disposed in an abutting relation with at least an abutment portion 220 of the second component 218. In the illustrative embodiment of FIG. 35, the locking elements 262 are cooperatively structured with the abutment portion 220 of the second component 218 to at least partially define a complementary locking interface 221 being disposed between the locking members 262 and the abutment portion 220 of the second component 218. As further shown in FIG. 35, when disposed in such an abutting relation, the locking members 262 of the locking assembly 260 are structured and disposed to prevent detachment of the second component 218 from the first component 222.

Figure 35:
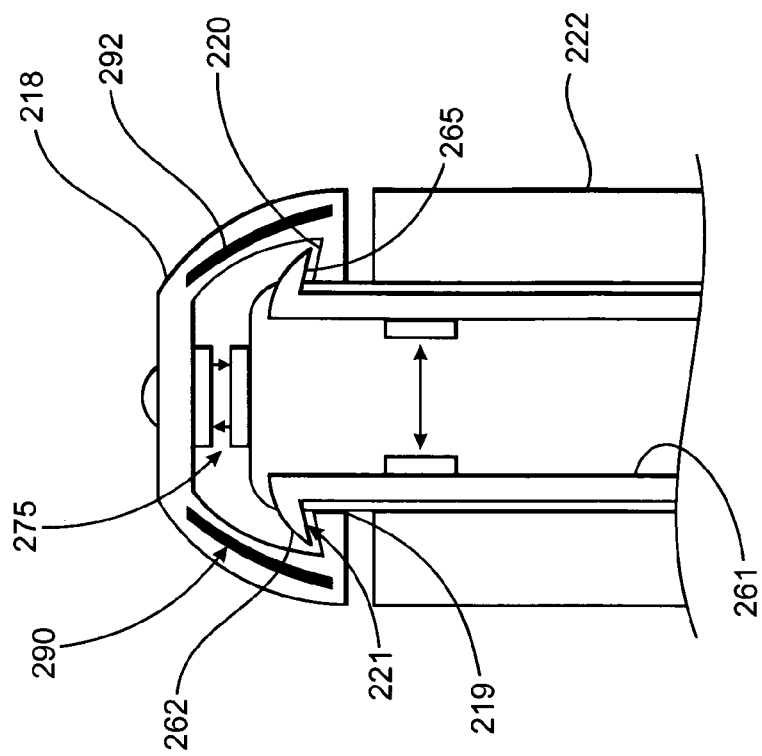
FIG. 35 is a partial cutaway view of one preferred embodiment of a quick connect coupling assembly illustrating a complementary locking interface between an abutment portion of a first component and a plurality of locking members.

More specifically, FIG. 35 illustrates a complementary locking interface 221 further defined by an abutment portion 220 of the second component 218 comprising a sloping surface extending downwardly from the receiving aperture 219 towards the exterior of the second component 218. Furthermore, the leading surface portions 265 of the locking members 262 of this illustrative embodiment also comprise a downwardly sloping surface which "compliments" the slope of the abutment portion 220, thereby further defining the complementary locking interface 221 and serving to prevent the unintentional detachment of the first component 222 from the second component 218. In particular, in this embodiment, the leading surface portions 265 of the locking members 262 must be extended up and over the sloping abutment portion 220 of the second component 218 before the locking members 262 may be disposed into an inwardly retracted release orientation, such as illustrated in FIG. 34, thereby permitting detachment of the first component 222 from the second component 218.

At least one embodiment of the quick connect coupling assembly 216 of the present invention comprises an attraction assembly 275 structured to facilitate disposition of the first component 222 and the second component 218 into a predetermined alignment with one another. The attraction assembly 275 of the present invention comprises at least one attraction element 276 mounted to a first component 222, or a second component 218, or, as illustrated in the embodiment of FIG. 31, the attraction assembly 275 comprises an attraction element 276 mounted to each of a first component 222 and a second component 218.

The attraction assembly 275 in at least one embodiment comprises a plurality of magnetic attraction elements 277, such as are shown in FIG. 33A. More in particular, and as in the illustrative embodiment of FIG. 33A, at least one magnetic attraction element 277 is mounted to each of the first component 222 and the second component 218. Furthermore, the magnetic attraction elements 277 are structured and disposed to create an attractive magnetic force to facilitate disposition of the first component 222 and the second component 218 into the predetermined alignment with one another, as illustrated, by way of example only, in FIG. 33A.

As is also illustrated in the figures, the magnetic attraction elements 277 are structured and disposed in a "free floating" configuration, that is to say, they are structured and disposed so as to prevent any physical contact with one another. This "free floating" feature provides several advantages over other magnetic attachment devices. First, by preventing physical contact, mechanical degradation of the magnets of the magnetic attraction elements 277 is essentially eliminated, thereby significantly increasing the useful life of the magnets. In addition, the "free floating" configuration facilitates detachment of the first component 222 and the second component 218, by eliminating the significant force required to separate magnetic elements which are physically contacting one another.

In at least one embodiment, the attractive magnetic force between the magnetic attraction members 277 is selectively adjustable. Specifically, in at least the embodiment of FIG. 33A, at least one of the magnetic attraction members 277 comprises an adjustable mount 278 structured to be moveable such that a distance between the elements 277 is selectively adjustable. In at least one embodiment, the adjustable mount 278 may comprise a threaded mount, as illustrated in FIGS. 33A and 34, wherein the distance between the magnetic attraction members 277 is adjusted by simply rotating the magnetic attraction element(s) 277 farther in or out via the adjustable mount 278.

In one further embodiment, at least one magnetic attraction element 277 is removeably mounted to either the first component 222 or the second component 218 via an adjustable mount 278, such that a magnetic attraction member 277 exhibiting greater or lesser magnetic force may be quickly and easily installed, thereby allowing a user to select the magnetic force to be exhibited by the attraction assembly 275 over a wide range of magnetic forces, such as may be necessitated by the various coupling applications in which the present assembly may be utilized. Of course, it is within the intent and scope of the present invention to adjust a distance between the magnetic attraction members 277 other than via a threaded mount, and in at least one embodiment, each of a plurality of magnetic attraction members 277 may comprise an adjustable mount 278.

The quick connect coupling assembly 216 of the present invention may also comprise a shielding mechanism 290, as represented in FIG. 35, having at least one shielding element 292 which is structured to direct the attractive magnetic force between the magnetic attractive elements 277. The shielding element 292 is further structured to prevent the attractive magnetic force from attracting an unintended object. The shielding mechanism 290 of the present invention may comprise a flux-entrapment shield, or a lossy shield, which are basic types of 60 Hz shields.

A flux-entrapment shield is typically constructed of a ferromagnetic, highly permeable nickel-iron alloy. In at least one embodiment, the shielding element 292 may comprise an alloy which is approximately 80% nickel and 20% iron, such as, Hipernom Alloy, CO-NETIC AA, Aumetal, AD-MU-80, etc. Further, the shielding element 292 may be structured to isolate an area from a magnetic source by either surrounding the area, such as a cylinder or rectangular box, or separating the area from the magnetic source, such as via a "U"-shaped or flat plate. In operation, the magnetic flux generated by a magnetic source preferentially enters and travels through the highly permeable material along a path of least magnetic reluctance, rather than passing through the highly permeable material to the area isolated by such a shielding element 292.

Alternatively, the shielding mechanism 290 of the present invention may employ a lossy magnetic shielding system which utilizes the eddy current losses occurring within highly conductive materials including, but not limited to, copper, aluminum, iron, steel, silicon-iron, etc. More in particular, when a highly conductive material is subject to a time varying, e.g., 60 Hz, magnetic field, magnetic currents are induced within the material which flow in closed circular paths, perpendicular to the inducing magnetic field. According to Lenz's Law, these eddy currents oppose the charges in the inducing field such that the magnetic fields produced by the circulating eddy currents act to cancel the larger, external inducing magnetic fields at or near the conductive surface of the shielding material, thereby imparting a shielding effect.

The figures illustrative of the present embodiment of a quick release coupling assembly 216 also show a biasing mechanism 270 comprising at least one biasing element 272 structured to normally dispose and maintain the locking members 262 of the locking assembly 260 in the outwardly extending locking orientation. As best illustrated in FIGS. 31 and 33A, in at least one embodiment, the biasing mechanism 270 comprises a magnetic biasing element 273 mounted to each of oppositely disposed ones of the plurality of locking elements 261. As further illustrated in the figures, the magnetic biasing elements 273 are structured and disposed so as to create a repulsive magnetic force between one another, as demonstrated by the double headed arrows in the referenced figures. In at least one embodiment, the magnetic biasing elements 273 are structured such that the repulsive magnetic force generated between the magnetic biasing elements 273 serves to maintain the locking members 262 disposed on corresponding ones of the locking elements 261 in the normally disposed outwardly extending orientation, by forcing the locking elements 261 away from one another in opposite directions, once again, as shown by the double headed arrows in FIGS. 31 and 33A.

In one further embodiment, the biasing mechanism 270 is structured such that a repulsive magnetic force between the magnetic biasing elements 273 is selectively adjustable. More in particular, at least one of the magnetic biasing elements 273 comprises an adjustable base structured to be moveable such that a distance between the magnetic biasing elements 273 mounted to oppositely disposed ones of the locking elements 261 is selectively adjustable, thereby affecting the magnitude of the repulsive force exerted by each magnetic biasing element 273 towards one another.

In yet one other embodiment of the quick connect coupling assembly 216 of the present invention, the biasing mechanism 270 comprises a spring 274, as represented in FIG. 33B, mounted between oppositely disposed ones of the plurality of locking elements 261 wherein the spring 274 is structured to maintain corresponding ones of the locking members 262 in the normally disposed outwardly extending orientation, once again, by forcing the locking elements 261 into opposite directions from one another. The spring 274 may be selected to provide greater or lesser amounts of force when disposed into an operative position, such as illustrated in FIG. 33B, such that, once again, the force generated by the biasing mechanism 270 may be selectively adjusted.

The quick connect coupling assembly 216 of the present invention also comprises a release mechanism 280 structured to permit the locking members 262 to be temporarily disposed into an inwardly retracted release orientation. More in particular, the release mechanism 280 comprises at least one release member 282 mounted to one of a plurality of locking elements 261, wherein the release member 282 is structured to be normally disposed in an outwardly extending orientation while the locking assembly 260 is disposed in a locking orientation, as is illustrated throughout the figures. Further, the release member 282 is disposable into a release orientation thereby temporarily disposing one or more locking member 262 into an inwardly retracted release orientation, as illustrated by way of example only in FIG. 34, such that the first component 222 and the second component 218 may be detached from one another. As further illustrated in FIG. 34, the release assembly 280 may comprise a plurality of release members 282 each mounted to a different one of a plurality of release elements 261 such that while a release force 283 is applied in the direction of the arrows, such as by squeezing by a user, each of a corresponding plurality of locking members 262 is temporarily disposed into the inwardly retracted release orientation To prevent unintentional disposition of one or more release member 282 into the release orientation, at least one embodiment of the present invention comprises a safety mechanism 284 structured to impede the application of a release force 283 to the release member 282. More in particular, the release mechanism 284 is structured and normally disposed in a safety on configuration which, in at least one embodiment, comprises a substantially overlying relation to the release member 282, as illustrated best in FIGS. 36 and 37. When desired by a user, the safety mechanism 284 is structured and disposable into a safety off configuration substantially exposing the release member(s) 282, as illustrated in FIGS. 36A and 37A, thereby permitting disposition of the release member(s) 282 into the release orientation.

To facilitate disposition between the safety on and safety off configurations, at least one embodiment of the present invention comprises a moveable safety member 285. More specifically, the moveable safety member 285 may comprise a slidable safety member 286 attached to the exterior of the first component 222 which is structured to be normally disposed in the overlying relation with the release mechanism 280, as in FIG. 36. When desired, the slidable safety member 286 may be repositioned in the direction of the arrows of FIG. 36A to permit application of a release force 283 to the release members 282, thereby allowing the first component 222 and the second component 218 to be detached from one another. In at least one alternative embodiment, the release mechanism 284 comprises a rotatable safety member 288 which may be repositioned in the direction of the arrows of FIG. 37A, once again, permitting application of a release force 283 to the release members 282.

FIG. 40 illustrates an embodiment of the present invention wherein the second component 222 of a quick connect coupling assembly 216 comprises a global positioning system ("GPS") microchip 300 mounted thereto. In at least one embodiment, the GPS microchip 300 is embedded in the first component 218, rather than the second component 222, in that the first component 218 is structured to remain attached to an animal via a collar or harness, so as to protect it from the elements, as well as to conceal its presence as may be desirable in some cases. More importantly, the GPS microchip 300 is structured to permit the location of the first component 218, and thus, the animal to which it is attached, to be tracked via a GPS satellite system, virtually anywhere on the planet. This embodiment of the present invention eliminates the need for implanting a GPS chip under the skin of an animal, as is commonly done today, which can result in discomfort the animal in many cases, as well as presenting, potentially serious, health risks to others.

Looking once again to FIG. 1, the present invention comprises an activation assembly 38. The activation assembly 38 is preferably, although not necessarily, integrated as part of a handle 40 structured to facilitate holding of the leash assembly during use. The handle 40 preferably includes a generally apertured construction 42 and further defines gripping means 43 dimensioned and configured to facilitate the holding or gripping of the handle 40 by a single hand of a user of the subject leash assembly. One feature of the present invention is the provision of an activation member as at 44 generally in the form of a spring biased push button, which, due to the force exerted thereon by a biasing spring (not shown for purposes of clarity) is preferably normally disposed in an outward position as shown. The activation member 44 is connected directly to a correspondingly positioned end of the release structure or release cable 24. The release cable 24, may be formed of a metallic material or other applicable materials. Regardless of the structural embodiments, release cable 24 should be sufficiently flexible to be rolled upon itself in a stored position or otherwise oriented as generally shown in FIG. 5, but should have sufficient structural integrity to be movable axially along its length, within the interior of the lead 10 and relative thereto. Such axial movement may be accomplished by a force exerted by the user of the subject assembly on the activation member or push button 44 as indicated by directional arrow 45.

With reference to FIG. 4, another preferred embodiment of the present invention comprises basic structural features similar to the embodiment of FIG. 1 and with the exception that the lead 10' has a somewhat flat strap like configuration extending along its length. However, at least a portion of the lead 10' defines a hollow interior along the entire length thereof for the positioning and axial movement of the release structure or cable 24. Moreover, as illustrated in FIG. 2A, a sheath structure 27 may be disposed within the lead 10'.

The activation assembly 38' of the embodiment of FIG. 4 is associated with a handle structure 40' having a somewhat different configuration than that of the embodiment of FIG. 1. More specifically, the handle 40' comprises an open, central aperture construction 42' having a grip 43' designed to facilitate gripping by one hand of the user of the subject assembly. In this embodiment, however, the activation assembly 38' comprises an activation member 44' in the form of a trigger type switch positionable for operation by a single finger of the gripping hand of the user of the subject assembly. The activation member 44' is normally biased into its outermost position, as shown in FIG. 4, by any type of biasing spring or the like. However, depression or movement of the activation member 44' to an inner position serves to axially move the release structure or cable 24. Such axial movement will exert an outward axial force on the plunger 60 which will serve to release the first component 18 of the coupling assembly 16 from the second component 22. Additional embodiments of the activation assembly are disclosed, such as 80' in FIG. 5, which is similar in structure and operation to activation assembly 80, as described hereinafter for the embodiment of FIG. 9.

An additional structural feature of the embodiment of FIG. 4 and in particular the activation assembly 38' is the inclusion of a lock structure indicated as 50. The lock structure 50 may have any applicable or adequate structure secured to handle 40' so as to prevent the depression or inward travel of the activation member 44'. This will prevent the inadvertent detachment of the coupling assembly 16 and eliminate the possibility of accidentally releasing or detaching the animal from the lead 10'.

Figure 4A:
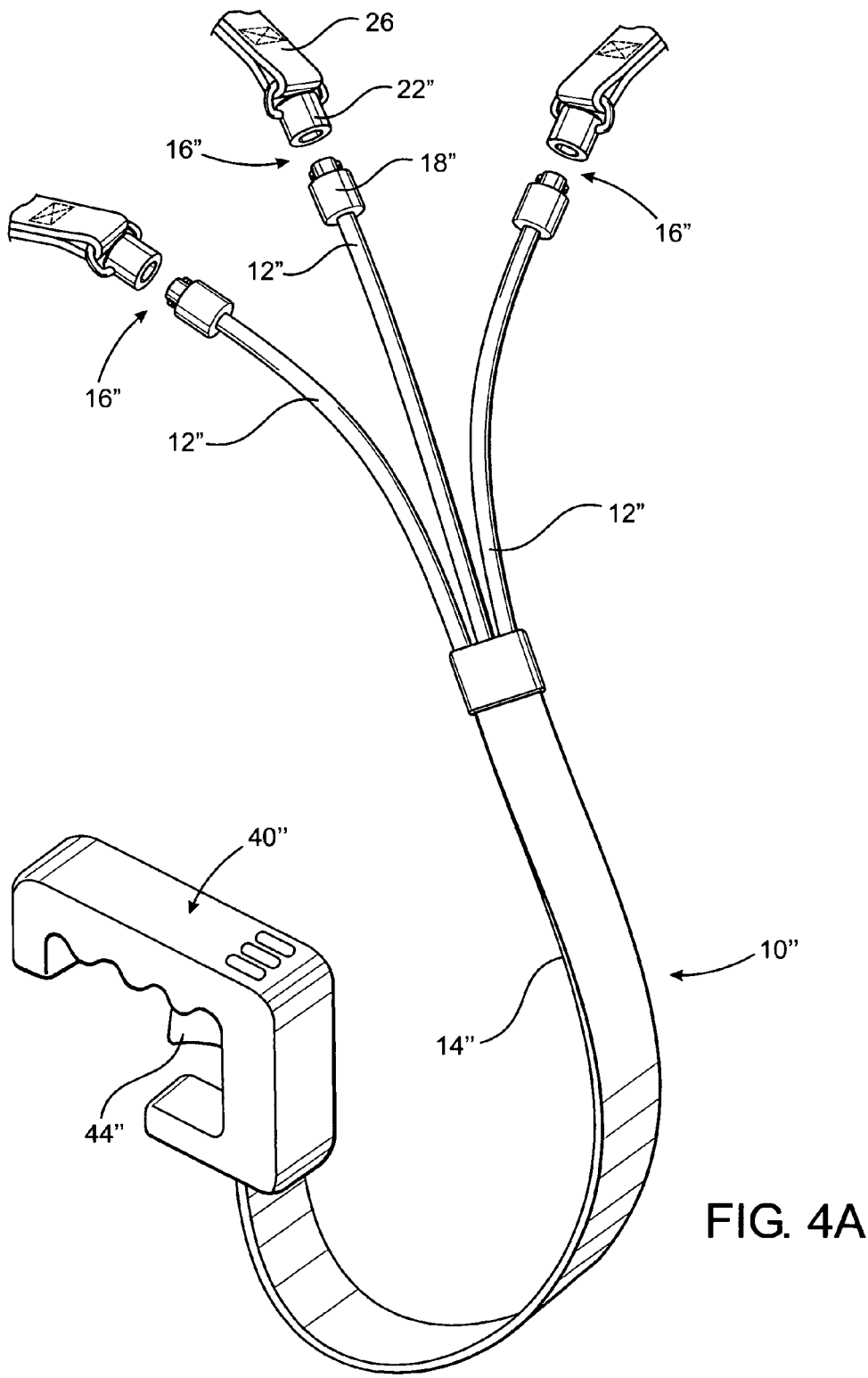
FIG. 4A is a perspective view showing one alternate embodiment of a lead of the present invention.

Yet another embodiment of the lead 10" is illustrated in FIG. 4A. Specifically, as shown, the lead 10" comprises a fixed composite proximal portion 14" interconnected to the handle 40", and a plurality of free distal ends 12". Each of the plurality of free distal ends 12" further comprising a first component 18" of a coupling assembly 16" structured to interconnect to a second component 22" mounted on or attached to a different one of a plurality of collars, harnesses, or similar attachment assemblies 26, such that a single lead 10" and handle 40" may be simultaneously attached to a plurality of animals. Further, in this embodiment, a selective activation member 44" is employed such that the handler may select any one of the plurality of coupling assemblies 16" to be released.

Figure 4B:
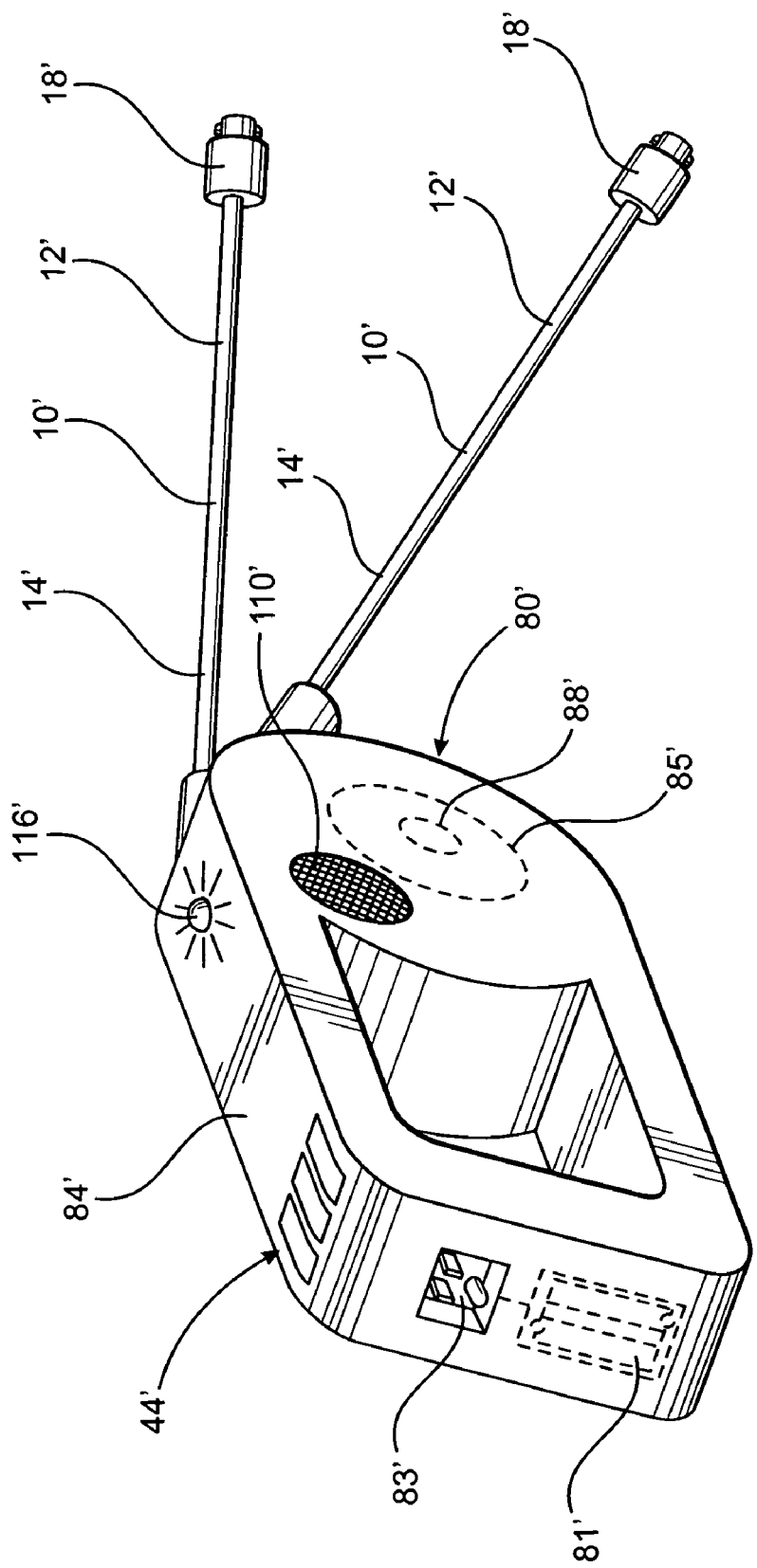
FIG. 4B is a perspective view of another alternate embodiment of a retractable leash assembly of the present invention comprising a plurality of leads.

One other embodiment of the retractable leash assembly of the present invention is illustrated in FIG. 4B. As shown, this embodiment comprises a housing 84' which is structured to facilitate a plurality of leads 10'. More in particular, the housing 84' is structured to permit at least a portion of each of the plurality of leads 10' to pass through at least a portion of the housing 84'. In addition, the housing 84' comprises an activation assembly 80' which preferably includes a drive mechanism, as shown in phantom at 85'. Each of the plurality of leads 10' comprises a proximal portion 14' disposed in an operative relationship with the housing 84', specifically, each proximal portion 14' is interconnected to at least a portion of the drive mechanism 85'. Each of the leads 10' also comprises a distal end 12' each interconnected to a different one of a plurality of first components 18' which are structured and disposed to engage a corresponding one of a plurality of second components 22' (not shown) being mounted on or attached to a different one of a plurality of collars, harnesses, or similar attachment assemblies 26' (not shown).

Similar to the embodiment illustrated in FIG. 4A, the embodiment of FIG. 4B comprises a selective activation member 44' structured such that the handler may select any one of the plurality of first components 18' to be released from its corresponding second component 22' (not shown). In addition, the drive mechanism 85' of the embodiment of FIG. 4B may be further structured such that the portion of each of the plurality of leads 10' may be released from or retracted into the housing 84' either independently of one another, or simultaneously and in a uniform manner [i.e. substantially similar rates of release or retraction], once again, via the selective activation member 44'. Thus, the embodiment of the retractable leash assembly illustrated in FIG. 4B provides the handler with considerable versatility in handling a plurality of animals which may be attached thereto.

As illustrated in FIG. 4B, the retractable leash assembly may comprise several additional features such as a rechargeable power supply 81' being electrically interconnected to a recharge port 83', the recharge port 83' preferably structured to accept a standard household power source in order to recharge the rechargeable power supply 81'. In at least one preferred embodiment, the rechargeable power supply 81' comprises a rechargeable battery pack.

Additionally, the embodiment of FIG. 4B illustrates the drive mechanism 85' further comprising a drive motor, shown in phantom at 88', and a voice activated control module 110' disposed in a communicative association with the drive motor 88'. More in particular, such communicative association is at least partially defined by the drive motor 88' operating to retract the portion of at least one of the plurality of leads 10' into the housing 84' or to release the portion of the lead 10' from the housing 84' upon delivery of a verbal command from the user to the voice activated control module 110'. In one preferred embodiment, the communicative association is further defined by the drive motor 88' operating to retract the portion of each of the plurality of leads 10' into the housing 84' or to release the portion of each of the plurality of the leads 10' from the housing 84' upon delivery of a verbal command from the user to the voice activated control module 110', wherein the leads may be released and/or retracted either independently or simultaneously in a uniform manner.

Yet one further embodiment of the retractable leash assembly may comprise a housing 84' constructed of a clear or otherwise light transmissive material and including an internal illumination source, such as one or more light emitting diodes 116', which may be activated under low light conditions thus providing a safety advantage to the handler, so that they may be seen by others, for example, automobile drivers, while utilizing the device at night. This embodiment may also comprise one or more leads 10' also being constructed of a clear or otherwise light transmissive material, such that the light emitting diode(s) 116' may also act to illuminate at least a portion of the leads(s) 10' thereby providing an additional safety feature to the handler, as well as to the animal attached thereto.

Figure 9:
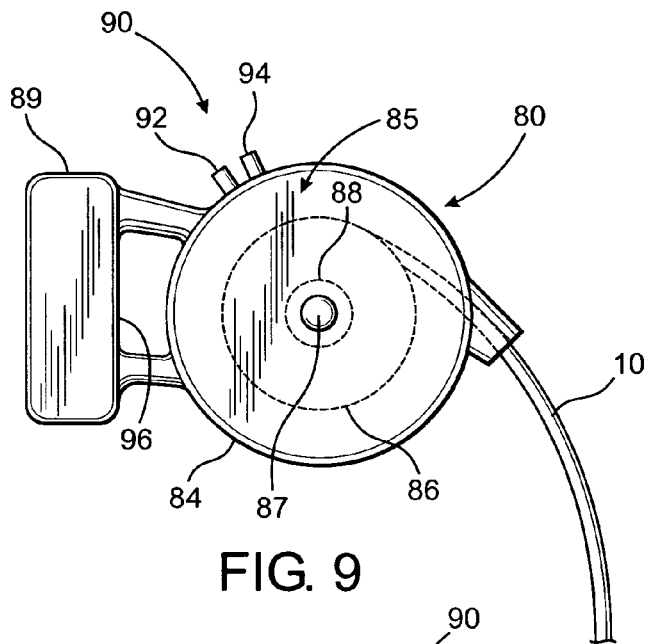
FIG. 9 is a side view of yet another preferred embodiment of an activation assembly associated with the leash assembly of the present invention.
Figure 10:
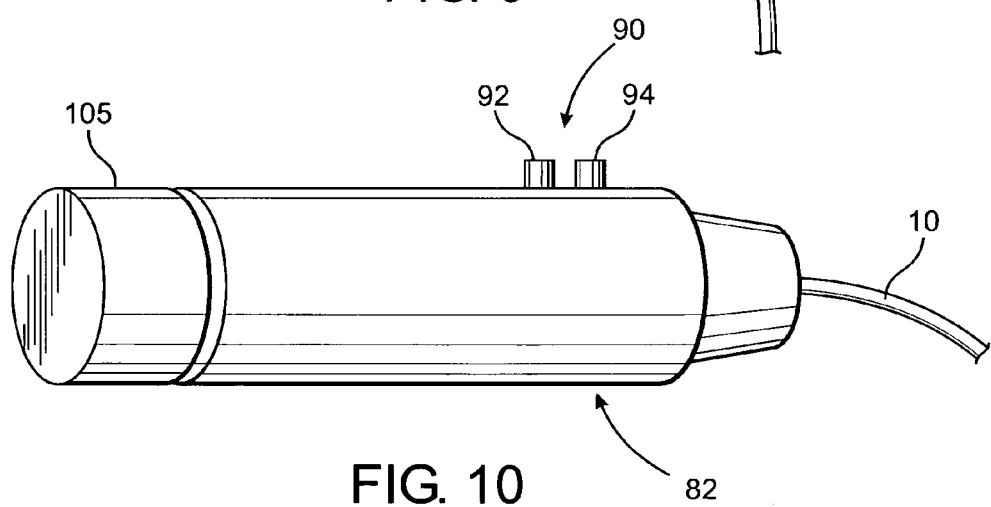
FIG. 10 is an external, perspective view of yet another embodiment of an activation assembly associated with the leash assembly of the present invention.
Figure 11:
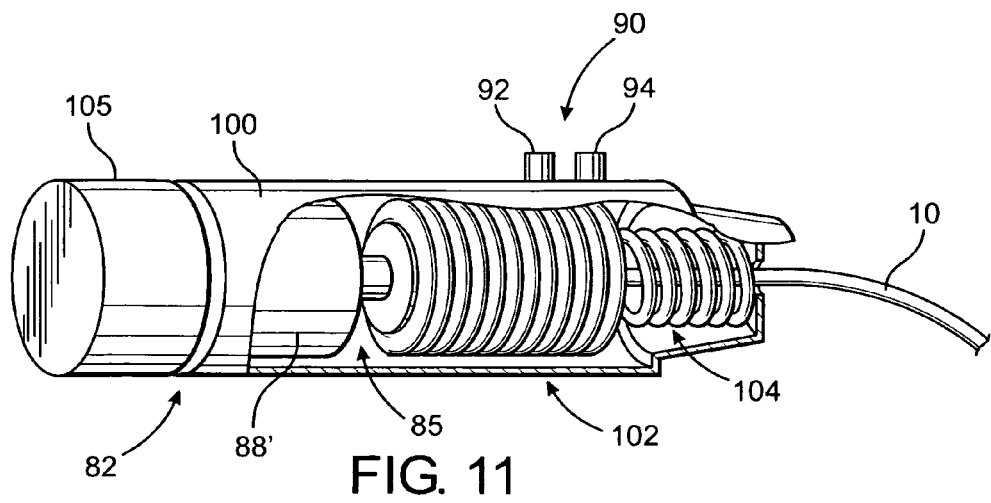
FIG. 11 is a perspective view showing interior structural details of the embodiment of FIG. 10.

Additional preferred embodiments of the present invention are shown in FIG. 9, and FIGS. 10 and 11, and relate to an activation assembly generally indicated as at 80 or 82, respectively. With regard to the embodiment of FIG. 9, the activation assembly 80 includes a housing 84 having an at least partially hollow interior for the mounting and enclosure of a drive mechanism 85 structured such that the proximal end of the lead 10 may be connected to a portion thereof. In at least one embodiment, the drive mechanism 85 comprising at least a storage or take-up spool indicated in phantom lines as 86. The take-up spool 86 is rotationally mounted on the interior of the housing 84 and, more specifically, is operated by the drive mechanism 85 which may further include a drive motor, such as is schematically represented in phantom line as 88. The drive motor 88 is preferably electrically powered and is specifically structured to be reversible so as to rotate the take-up spool 86 in opposite directions. The opposite directions of rotation of the drive motor 88 serve to either retract or release the lead 10 thereby allowing complete control over a tethered animal attached to the distal or free end of the lead 10. By virtue of the drive mechanism 85 comprising the drive motor 88 and the take-up spool 86, a user or handler of the subject leash assembly is allowed to avoid the disadvantages associated with spring driven, retraction structures of the type typically found in conventional retractable leash assemblies. The drive mechanism 85 may also utilize magnetic propulsion, as described above, to further facilitate the release and/or retraction of the lead 10 by the drive mechanism 85.

In one preferred embodiment, the activation assembly 80 further comprises a release control mechanism structured to regulate the rate of release of the lead 10 from the housing 84 of the activation assembly 80, upon detection of a predetermined condition or control set point. More specifically, the release control mechanism is structured to either substantially stop the release of the lead 10 from the housing 84, or to attenuate the rate of release of the lead 10. The predetermined condition or set point may include a particular velocity of release of the lead 10 from the housing 84, or a particular acceleration of the release of the lead 10 from the housing 84. In at least one embodiment, the release control mechanism is structured to cooperatively associate with the drive mechanism 85 to either substantially stop or attenuate the release of the lead 10 from the housing 84. In order to facilitate attenuation of the release of the lead 10, the release control mechanism may incorporate a computerized time delay program which allows the handler to preselect a degree of attenuation for the rate of release of the lead 10 from the housing 84 as appropriate, based upon the size of the animal being controlled with the leash assembly. Additionally, the computer program also being structured to control the velocity of the drive motor 88, in accordance with the preselected degree of attenuation, upon detection of the predetermined condition.

Further with regard to the embodiment of FIG. 9 the housing 84 includes a handle structure generally indicated as 89 which may be dimensioned and configured to have a hollow interior so as to house an electrical power supply used to energize at least the drive motor 88. Such an electrical power supply of course may be in the form of a rechargeable direct current battery pack, or another type of rechargeable power supply such as, by way of example, a solar power supply having storage capabilities, structured to supply sufficient power to operate the drive motor 88. The housing 84' may also include a recharge port as at 83' to permit interconnection of the rechargeable direct current battery pack to a source of power, such as via a standard household current power source, as shown in FIG. 4B. It should also be noted that the overall configuration of the housing 84 could be such as to include an apertured configuration as at 96 which along with the dimension and configuration of the battery casing segment of the handle structure 89 may form a handle or grip to facilitate carrying or manipulation of the activation assembly 80.

The activation assembly 80 or 82 further comprises a switching assembly, generally indicated as 90, wherein one or more switches as at 92 may be used to operate the drive motor 88 or 88' and an additional one or two switches as at 94 are used to axially move the aforementioned release cable 24 so as to cause the release of components 18 and 22 of the coupling assembly 16. Alternatively, the activation assembly 80 or 82 may incorporate a voice activated control module 110 including an audio receiver 112 disposed in a communicative relationship with an integrated computerized circuit board 114 which controls the operation of the drive motor 88 or 88', thereby controlling either the retraction or release the lead 10, based upon a verbal command from the handler to the voice activated control module 110, via the audio receiver 112. In addition, the voice activated control module 110 may also be utilized to control the release cable 24 or other release mechanism upon verbal command of the handler. In yet another embodiment of the present invention, the coupling assembly 16 or 28 may comprise a voice activated control module 110, wherein the coupling assembly 16 or 28 is structured to release the first component 18 or 29 from the second component 22 or 30, respectively, based upon a verbal command from the handler to the audio receiver 112.

In at least one embodiment, the voice activated control module 110 further comprises an audio transmitter, for example, an audio speaker in combination with the audio receiver 112, such that the handler may remotely convey verbal or other audible signals to the animal or animals being restrained by the leash assembly. The audio transmitter may be mounted to the activation assembly 80 or 82, or, in at least one embodiment, the audio transmitter may be mounted directly to the coupling assembly 16. Additionally, the verbal or other audible signal may be preprogrammed such that the handler may convey the desired verbal or other audible signal to the animal by merely selecting the desired preprogrammed command, such as, via a keypad located on the activation assembly 80 or 82, or on a remote transmitter structured to communicate with the voice activated module 110.

With regard to the additional preferred embodiment of FIGS. 10 and 11, the activation assembly 82 comprises a housing as at 100 having a substantially hollow interior configuration for the mounting of a drive motor 88' and a storage or take-up spool generally indicated as 102. The take-up spool 102 may have a spiral configuration which stores the lead 10 about the length of the take-up spool 102 wherein a cushioning spring as at 104 is provided to cushion the movement of the lead 10 into and out of the housing 100. Again, the drive motor 88' is structured to be reversible so as to selectively accomplish both retraction and release of the lead 10 relative to the take-up spool 102. A switching assembly generally indicated as at 90 is also mounted on the housing 100 operatively associated with the drive motor 88' and to the release structure in the form of release cable 24 as explained above. As indicated above with reference to the embodiment of FIG. 9, the drive motor 88' may incorporate the voice activated control module 110 to control the drive motor 88' to retract or release the lead 10 and/or to control the release cable 24 or other release mechanism, based upon the particular verbal command from the handler. A separable casing segment 105 may be provided to enclose and secure a rechargeable battery therein, wherein the entire casing 105 and the battery mounted on the interior thereof may be removed from the remainder of the housing 100 for purposes of recharging or replacing.

Of course, however, in either of the embodiments comprising a drive mechanism 85, the drive motor 88 or 88' may be configured to only manipulate the release cable 24, with the lead 10 itself being either of a fixed length or retractable. For example, in an embodiment with a long lead 10 or wherein the lead 10 is substantially wound in a stored orientation, a greater force may be required to actuate the release cable 24. As such, the drive motor could be used solely for the release cable 24. Additionally, whether the drive motor 88 provides for powered movement of the lead 10 and/or the release cable 24, a one way drive motor could also be effectively employed so long as an automatically or affirmatively releasing engagement with the retracted lead 10 is achieved. For example, if the lead 10 is retracted by the drive motor 88 or 88' a similar release as to that which is normally provided to release an inward spring bias can be employed to allow the lead 10 to be released without causing or requiring a reversal of the drive motor 88 or 88'. Also, as to the release cable 24, only a momentary axial force applied to the release cable 24 is required to release the first component 18 from the second component 22. As such, the drive motor 88 or 88' could be configured to pull on the release cable 24 a limited amount of time, after which it may automatically back out after which a normal bias on the release cable 24 can cause a clutch type release.

Another embodiment of the activation assembly 80 or 82 may include the electrical power supply operatively associated with the electromagnet of the alternative embodiment of the release structure 24 presented above. The activation assembly 80 or 82 operates by providing sufficient electrical current to the electromagnet to reverse its polarity such that it exhibits either attractive or repulsive magnetic forces relative to the locking members 62. The attractive or repulsive magnetic forces may cause the locking members 62 to be repositioned from their normally biased outwardly extending locking orientation into their retracted orientation, thereby permitting the first and second components 18' and 22' to be easily released from one another. Alternatively, the attractive or repulsive magnetic forces may cause the locking members 62 to be repositioned from their retracted orientation into their normally biased outwardly extending locking orientation, thereby securing the first and second components 18' and 22' to one another.

In yet another embodiment, the locking members 62 may comprise a shape memory alloy structured to deform from a normally biased outwardly extending locking orientation to a retracted orientation, upon application of an electrical current, thereby permitting the first and second components 18' and 22' to be easily released from one another. Alternatively, the release cable 24 or other release structure may comprise a shape memory alloy structured to deform, once again, upon application of an electrical current, thereby causing the locking members 62 to be repositioned from a normally biased outwardly extending locking orientation to a retracted orientation, thus allowing the first and second components 18' and 22' to be released from one another.

As previously described, the switching assembly 90 may be employed to activate the electrical current to the electromagnet when quick and easy release of the first and second components 18' and 22' is desired. In at least one embodiment of the present invention, the switching assembly 90 comprises part of an electrical circuit which directly applies the electrical current to the electromagnet, while in at least one other embodiment, the switching assembly 90 utilizes a fiber optic circuit which indirectly causes the electrical current to be applied to the electromagnet. The switching assembly 90 may further be structured so as to permit the handler to transmit a small electrical impulse to the attachment assembly 26 worn by the animal, thereby directing a small electrical shock, vibration, or other electrical stimulation to the animal, such as have been proven to be an effective training tool. In a preferred embodiment, the handler can selectively adjust the magnitude of the electrical impulse to suit the size and temperament of the animal being trained.

Each of the embodiments of the activation assembly 80 or 82 comprising the drive mechanism 85 as presented herein may additionally comprise a radio or other remote signal receiver structured to activate or deactivate the drive mechanism 85 and/or the release cable 24 or other release mechanism from a remote location via a radio transmitter. In this embodiment, a receiver may be operatively connected to the activation assembly 80 or 82, which is structured to receive predetermined signal(s) from a remotely located radio transmitter, or other remote signal transmitter. Once the transmitted signal is received, the receiver triggers the switch assembly 90 such that the activation assembly 80 or 82 causes the drive motor 88 or 88' to operate and retract or release the lead 10, and/or such as to cause the release structure 24 to release the first and second components 18' and 22' from one another.

One other embodiment of the activation assembly 80 of the present invention comprises a lead aligning mechanism, generally shown as 120 in FIGS. 12 through 17. The lead aligning mechanism 120 is structured to maintain the lead 10 in an aligned position relative to the housing 84 of the activation assembly 80 as the lead 10 is retracted into or released from the housing 84. More specifically, the aligned position is at least partially defined when the lead 10 is positioned relative to the housing 84 so as to minimize the potential for binding or other restriction of movement of the lead 10 either into or from the housing 84, such as, for example, when the lead 10 forms an angle of approximately ninety (90) degrees with the housing at its point of entry. The minimization of binding or other restriction of the lead 10 into and out of the housing provides the handler with greater control over the animal being restrained by the leash assembly.

Figure 16:
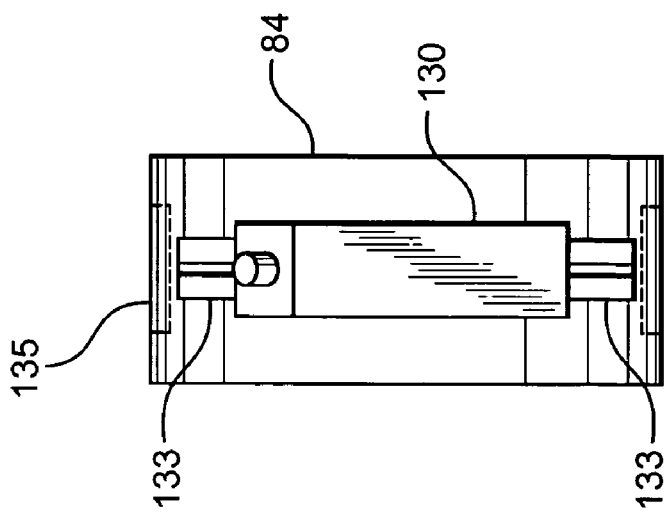
FIG. 16 is an end view of the activation assembly of FIG. 15 along lines 16-16 thereof.
Figure 15:
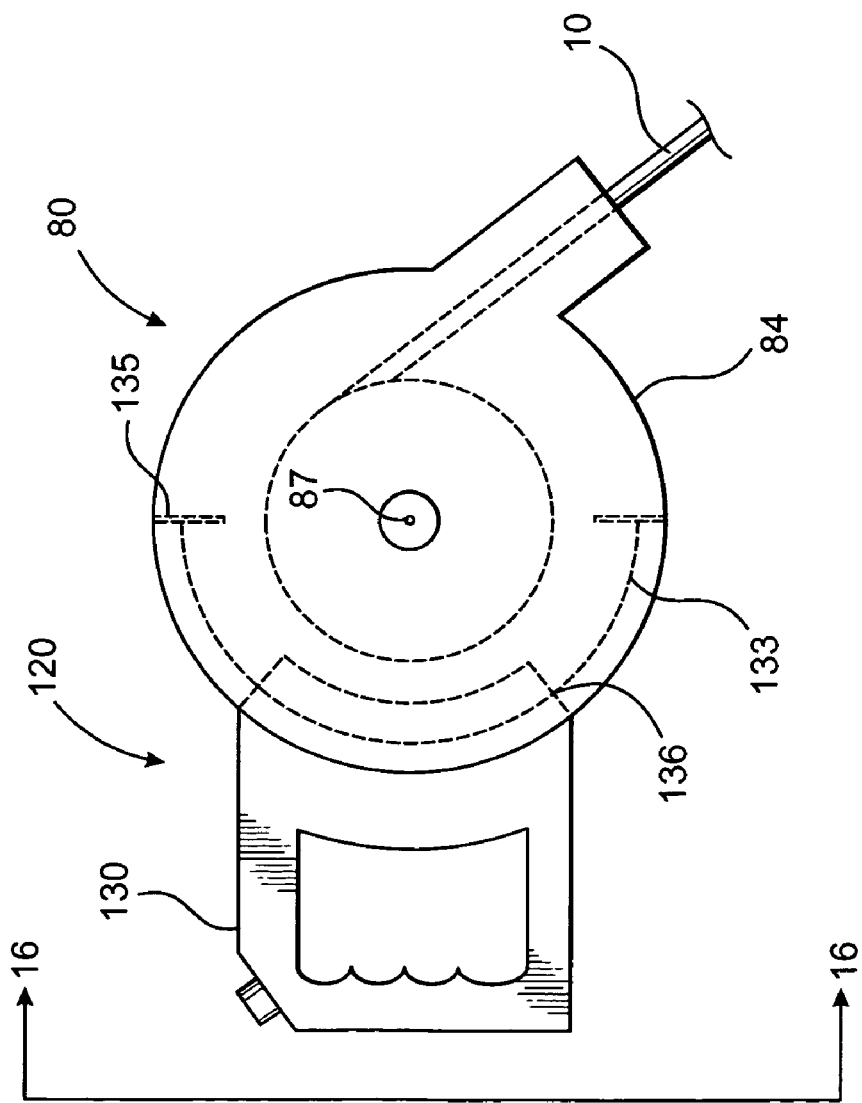
FIG. 15 is a side view of the activation assembly of FIG. 12 illustrating another embodiment of a lead aligning mechanism.

In one embodiment, as illustrated in FIGS. 12 through 16, the lead aligning mechanism 120 is movable along at least a portion of the housing 84 in an arcuate path about a central axis 87, and in at least one embodiment, the lead aligning mechanism 120 comprises a moveable grip member 130. Specifically, the movable grip member 130 is structured and disposed to moveably engage a grip member track, such as, by way of example only, an external grip member track 132, as illustrated in FIGS. 12 through 14. In another embodiment, the grip member track may comprise an internal grip member track 133, as illustrated in FIGS. 15 and 16. The degree of movement of the moveable grip member 130 is limited by grip member track stops 135, positioned at each end of the grip member track 132 or 133, when either end of the moveable grip member 136 contacts either grip member track stop 135. It is understood that as the distance between the animal and the handler holding the activation assembly 80 increases and decreases, the angle formed between the lead and the activation assembly 80 also increases and decreases, respectively. However, by virtue of the lead aligning mechanism 120 being moveable, and more specifically, the moveable grip member 130 being rotatable along at least a portion of the housing 84 about the central axis 87, it is also understood that the lead 10 is maintained in a substantially normal orientation relative to the housing 84. Thus, the lead aligning mechanism 120 minimizes the potential for binding or other restriction of movement of the lead 10 into or from the housing 84, without requiring the handler to adjust or reposition of the housing 84 of the activation assembly 80 relative to the lead 10.

Figure 18:
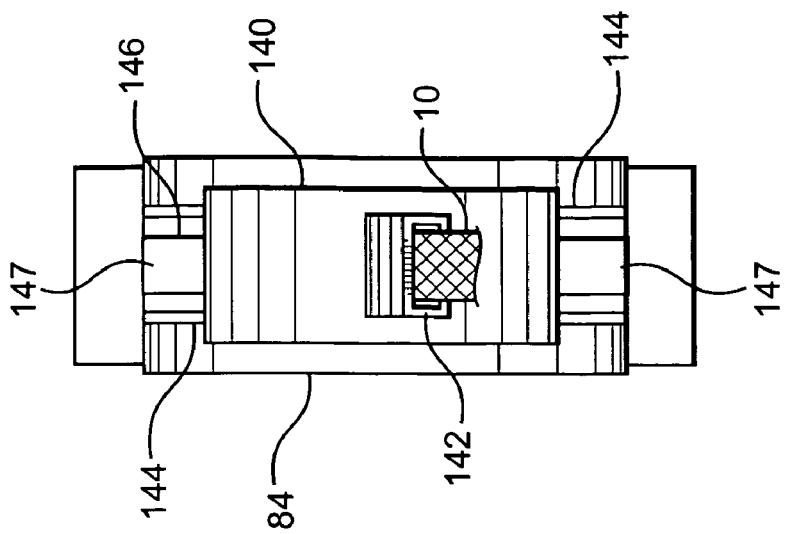
FIG. 18 is an end view of the activation assembly of FIG. 17 along lines 18-18 thereof.
Figure 17:
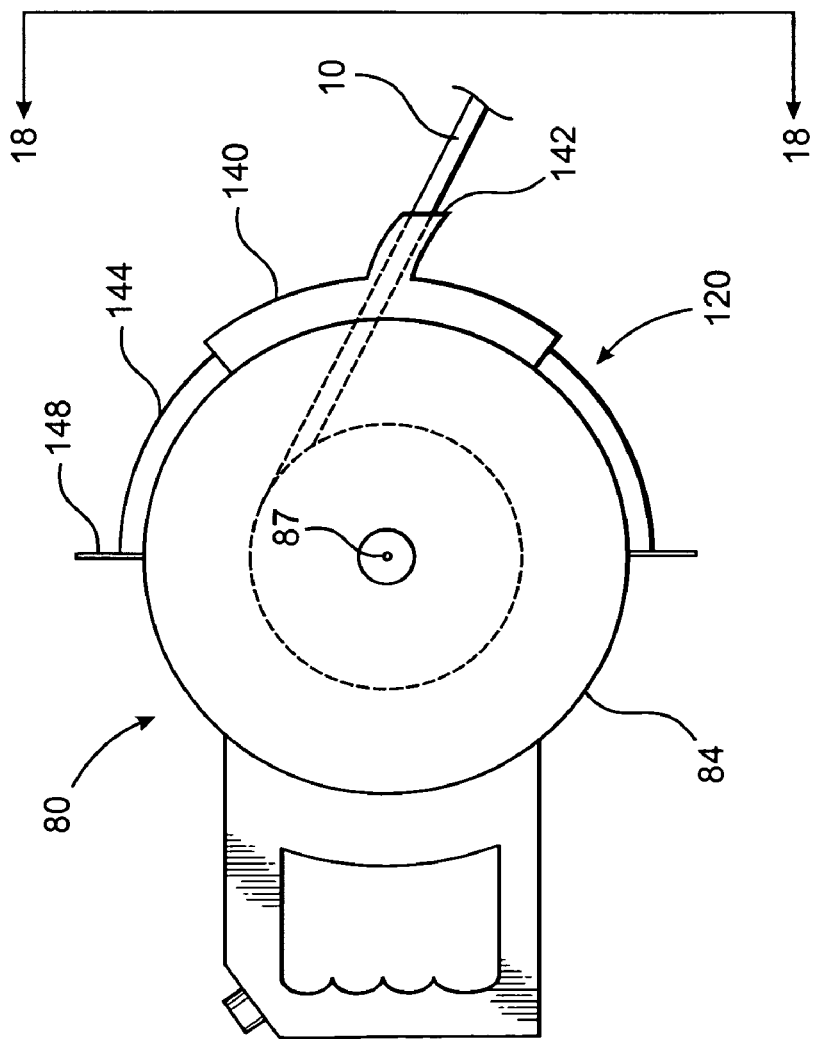
FIG. 17 is a side view of the activation assembly of FIG. 12 illustrating another embodiment of a lead aligning mechanism.

Another embodiment of the lead aligning mechanism 120 is illustrated in FIGS. 17 and 18. In this embodiment, the lead aligning mechanism 120 comprises a movable slide member 140, which is also structured to be movable along at least a portion of the housing 84 of the activation assembly 80 along an arcuate path about the central axis 87. As illustrated in the figures, the movable slide member 140 comprises a slide slot 142 structured to permit at least a portion of lead 10 to pass therethrough into and out of the housing 84 of the activation assembly 80. The lead aligning mechanism 120, in this embodiment, comprises a slide member track 144 which may be mounted along an exterior portion of the housing 84, as illustrated in FIG. 17. However, it is understood that the slide member track 144 could be disposed along the interior of the housing 84 in a similar manner as the internal grip member track 133, as illustrated in FIGS. 15 and 16. Further, in this embodiment, the housing 84 comprises a lead receiving channel 146 which is positioned substantially along the path of the slide member track 144, the lead receiving channel 146 being wide enough to permit the lead 10 to freely pass therethrough into the housing 84 regardless of the position of the moveable slide member 140 along the slide member track 144. Each end 147 of the lead receiving channel 146 may serve to limit the degree of movement of the moveable slide member 140 along the path of the slide member track 144, similar to the grip member track stops 135, or alternatively, one or more slide member track stops 148 may be employed.

Figure 20:
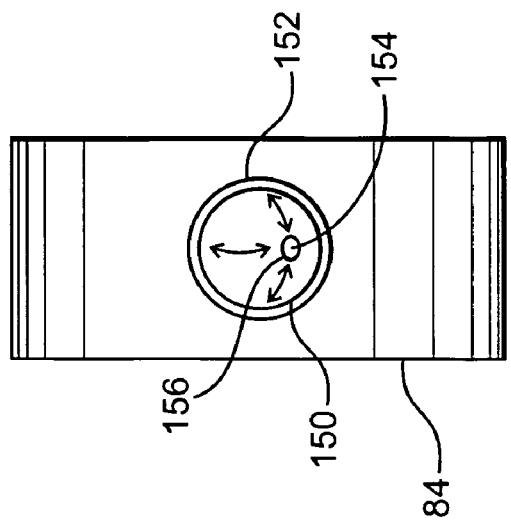
FIG. 20 is an end view of the activation assembly of FIG. 19 along lines 20-20 thereof.
Figure 19:
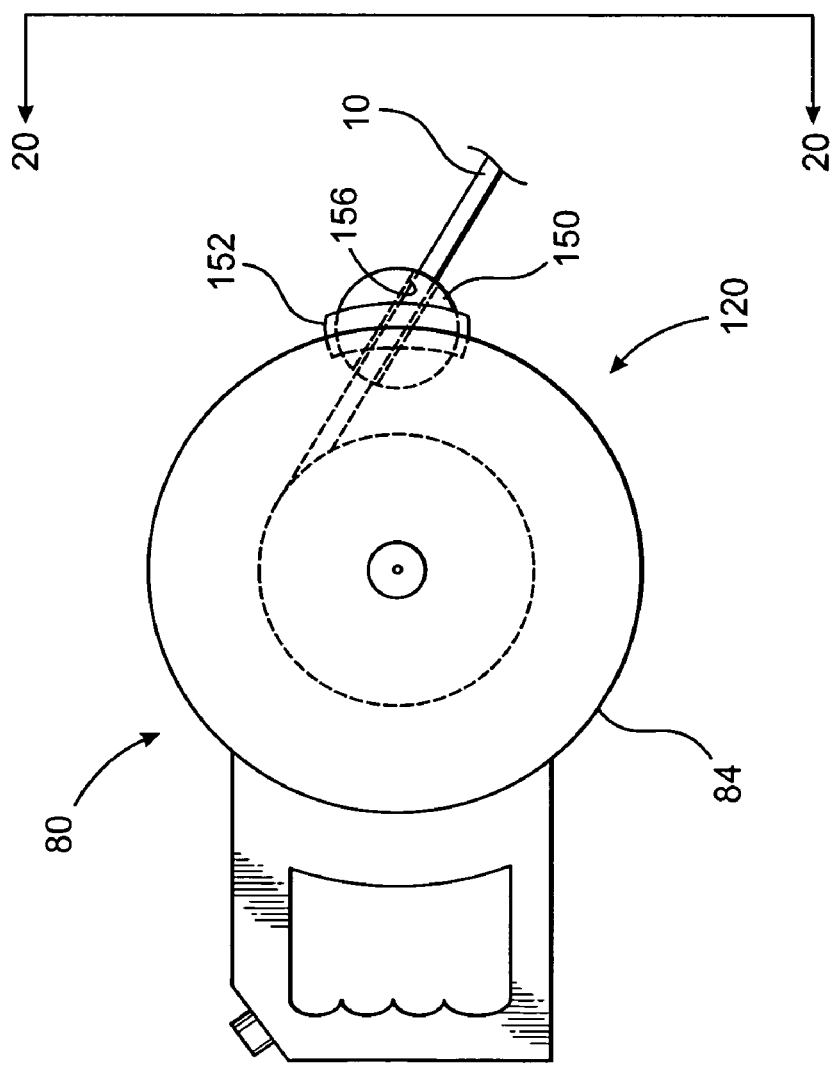
FIG. 19 is a side view of the activation assembly of FIG. 12 illustrating another embodiment of a lead aligning mechanism.
Figure 21:
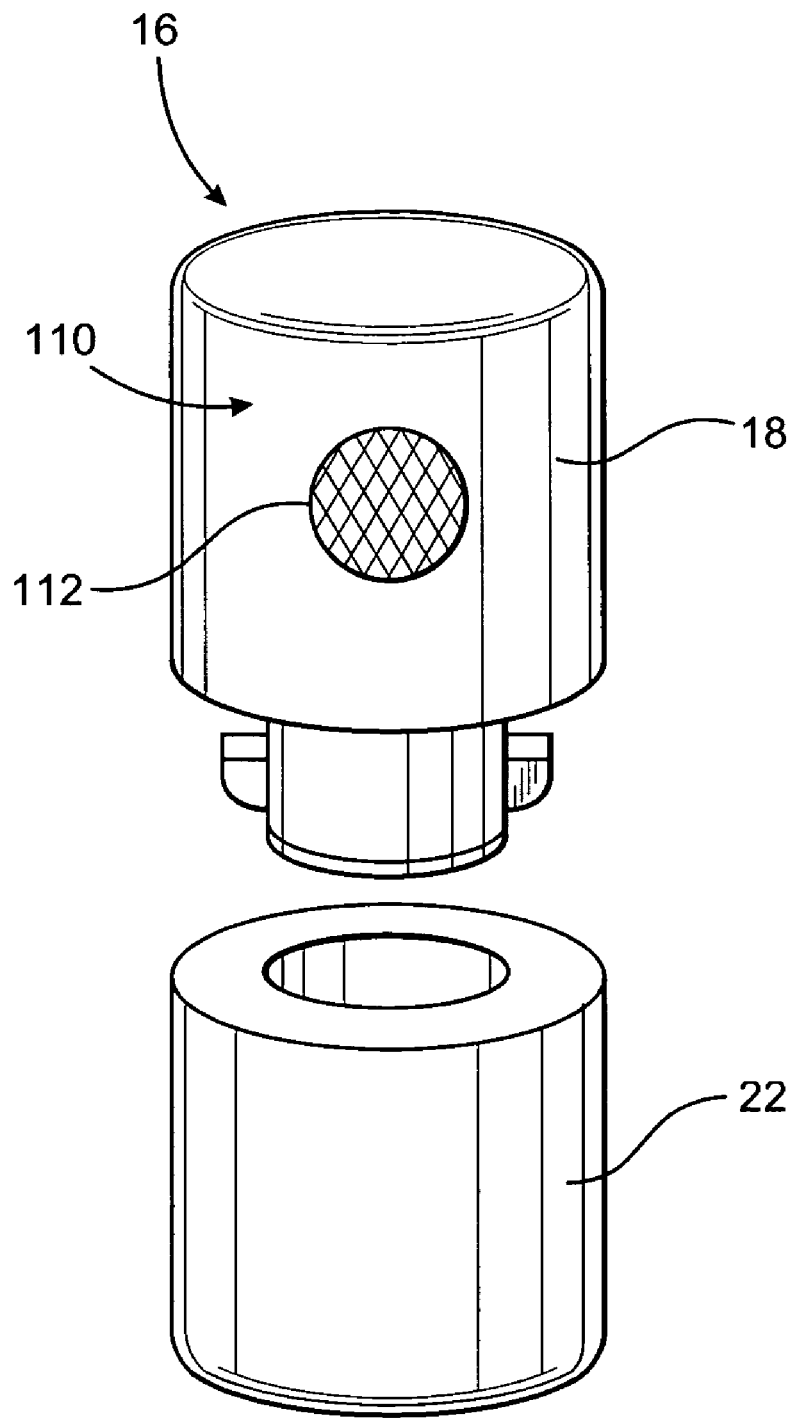
FIG. 21 is a perspective view in partially exploded form of another preferred embodiment of the quick connect coupling assembly associated with the present invention illustrating a voice activated control module.

In yet another embodiment, the lead aligning mechanism 120 may comprise a guide member 150, as illustrated in FIGS. 19 and 20. The guide member 150, as shown, comprises a generally spherical configuration and is structured to be moveably secured within a guide seat 152, which is preferably disposed about a circumference of the guide member 150 and connected to the housing 84 of the activation assembly 80. In particular, the guide member 150 is structured to rotate freely about a guide axis 154 in any direction or path, as illustrated by the directional arrows in FIG. 20, over a surface comprising substantially a hemisphere of the guide member 150 which is extending outwardly from the housing 84. The guide member 150 comprises a guide channel 156 disposed substantially along the guide axis 154 and structured to permit the lead 10 to pass therethrough into and out of the housing 84. It is understood from the figures that the lead aligning mechanism 120 comprising the guide member 150 provides the greatest range of lead alignment by virtue of the fact that the guide member 150 is structured to permit the lead 10 to move from side to side as well as up and down relative to the housing 84 of the activation assembly 80.

Figure 22:
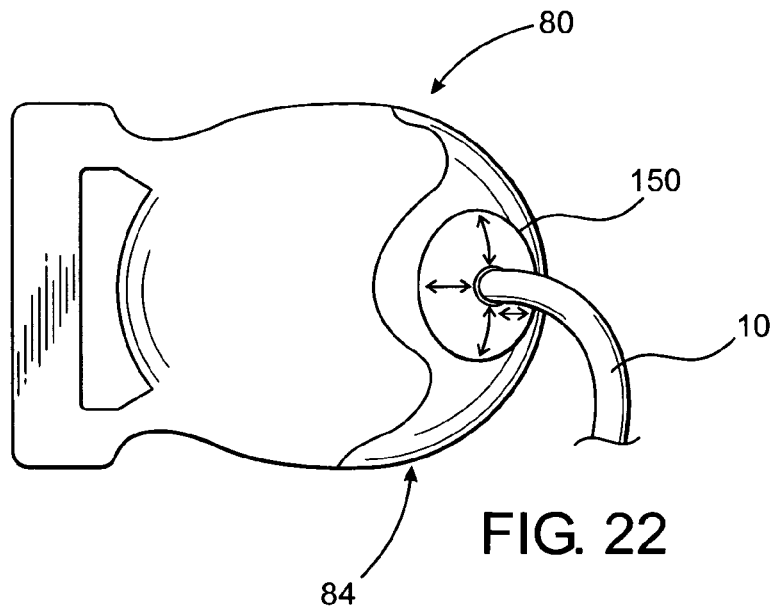
FIG. 22 is a side view of another embodiment of an activation assembly of the present invention illustrating a lead aligning mechanism.

In the embodiment of the activation assembly 80 illustrated in FIG. 22, the portion of the housing 84 to which the guide member 150 is connected comprises a wide configuration to facilitate a larger directional range of movement of the lead 10, for example, from side to side and up and down relative to the housing 84.

Figure 23:
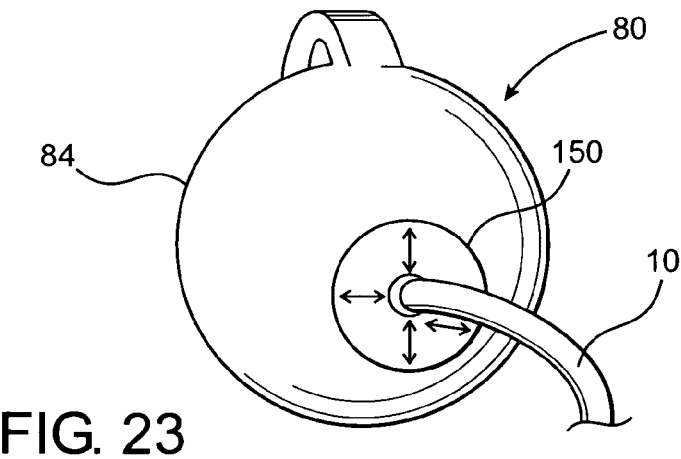
FIG. 23 is a perspective view of another embodiment of an activation assembly of the present invention illustrating a lead aligning mechanism.

FIG. 23 illustrates yet another embodiment of the activation assembly 80 wherein the housing 84 comprises a generally spherical configuration. In this embodiment, the take-up spool 86 is structured such that the lead 10 also comprises a substantially spherical configuration within the housing 84, as it is wound onto the take-up spool 86.

Figure 24:
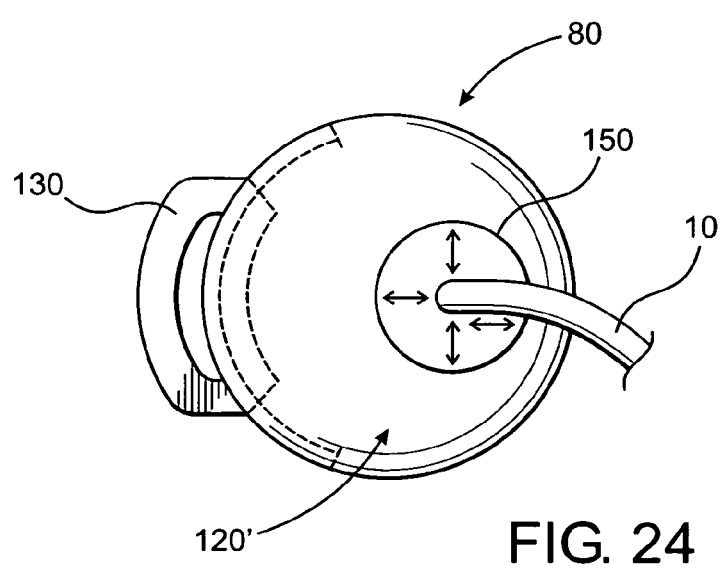
FIG. 24 is a perspective view of another embodiment of an activation assembly of the present invention illustrating a composite lead aligning mechanism.

Yet another embodiment of an activation assembly 80 is illustrated in FIG. 24. In particular, the embodiment of FIG. 24 illustrates the activation assembly comprising a composite lead aligning mechanism 120'. As shown in the figure, the composite lead aligning mechanism 120' comprises a moveable grip member 130, similar to the embodiment of FIGS. 15 and 16, and a guide member 150, as illustrated in FIGS. 19, 20, 22, and 23. The composite lead aligning mechanism 120' allows the lead to move freely in both arcuate and rotational directions relative to the housing 84 of the activation assembly 80.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A quick connect coupling assembly structured to allow quick connection and quick release, said coupling assembly comprising:

a first component and a second component cooperatively structured to assume an attached orientation, said first component comprises a fixed portion and a moveable portion wherein said moveable portion is rotatably attached to said fixed portion and is structured to swivel relative thereto, a locking assembly structured to retain said first component and said second component in said attached orientation, said locking assembly comprising a plurality of locking elements disposed in a movably engaging relation with said first component, each of said locking elements comprising a locking arm having a locking member disposed at one end thereof, said locking members structured to be disposed in an outwardly extending locking orientation, said outwardly extending locking orientation at least partially defined by said locking members structured to engage at least a portion of said second component in an abutting relation to prevent detachment of said second component from said first component while disposed in said attached orientation, a biasing mechanism structured to normally dispose and maintain said locking members in said outwardly extending locking orientation, said biasing mechanism comprises a spring mounted between oppositely disposed ones of said plurality of locking elements wherein said spring is structured to maintain corresponding ones of said locking members in said normally disposed outwardly extending orientation, and a release mechanism structured to permit said locking members to be temporarily disposed into an inwardly retracted release orientation.

2. A quick connect coupling assembly structured to allow quick connection and quick release, said coupling assembly comprising:

a first component and a second component cooperatively structured to assume an attached orientation when disposed into a predetermined alignment with one another, a locking assembly structured to retain said first component and said second component in said attached orientation, said locking assembly comprising a plurality of locking elements movably interconnected to said first component, each of said locking elements comprising a locking arm having a locking member disposed at one end thereof, said locking members structured to be normally disposed and maintained in an outwardly extending locking orientation, said outwardly extending locking orientation at least partially defined by said locking members structured to engage at least a portion of said second component in an abutting relation to prevent detachment of said second component from said first component while disposed in said attached orientation, a biasing mechanism structured to normally dispose and maintain said locking members in said outwardly extending locking orientation, said biasing mechanism comprises a spring mounted between oppositely disposed ones of said plurality of locking elements wherein said spring is structured to maintain corresponding ones of said locking members in said normally disposed outwardly extending orientation, an attraction assembly structured to automatically position said first component and said second component into said predetermined alignment when said components are disposed in an attachment range of one another, wherein said attraction assembly comprises a plurality of magnetic attraction elements, and a release mechanism structured to permit said locking members to be temporarily disposed into an inwardly retracted release orientation.

3. The assembly as recited in claim 2 wherein at least one of said plurality of magnetic attraction elements is mounted to each of said first and second components, said magnetic attraction elements being structured and disposed to create an attractive magnetic force to facilitate disposition of said first and second components into said predetermined alignment.

4. The assembly as recited in claim 3 wherein said attractive magnetic force is selectively adjustable.

5. The assembly as recited in claim 4 further comprising at least one shielding element structured to direct said attractive magnetic force between said magnetic elements.

6. The assembly as recited in claim 5 wherein said at least one shielding element is further structured to prevent said attractive magnetic force from attracting an unintended object.

\* \* \* \* \*